(12) United States Patent
Syngkon et al.

(10) Patent No.: US 10,616,183 B2
(45) Date of Patent: Apr. 7, 2020

(54) TECHNIQUES FOR SECURING SUPPLY CHAIN ELECTRONIC TRANSACTIONS

(71) Applicant: Oracle International Corporation, Redwood Shores, CA (US)

(72) Inventors: Daio Syngkon, Mountain View, CA (US); Susan Flierl, Portola Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 157 days.

(21) Appl. No.: 15/051,437

(22) Filed: Feb. 23, 2016

(65) Prior Publication Data
US 2016/0173457 A1   Jun. 16, 2016

Related U.S. Application Data

(63) Continuation of application No. 12/504,596, filed on Jul. 16, 2009, now Pat. No. 9,306,750.

(51) Int. Cl.
   *H04L 29/06* (2006.01)
   *G06Q 10/08* (2012.01)
   *H04L 9/32* (2006.01)

(52) U.S. Cl.
   CPC ......... *H04L 63/0428* (2013.01); *G06Q 10/08* (2013.01); *G06Q 10/0833* (2013.01); *H04L 9/3247* (2013.01); *H04L 2209/56* (2013.01); *H04L 2209/805* (2013.01)

(58) Field of Classification Search
   USPC ....................................................... 713/170
   See application file for complete search history.

(56) References Cited

U.S. PATENT DOCUMENTS

| | | | |
|---|---|---|---|
| 5,444,851 A | 8/1995 | Woest | |
| 6,236,972 B1* | 5/2001 | Shkedy | G06Q 10/087 705/26.1 |
| 6,289,462 B1 | 9/2001 | McNabb et al. | |
| 7,387,249 B2* | 6/2008 | Hudson | G06K 19/06028 235/384 |
| 7,879,111 B2* | 2/2011 | Hardacker | H04W 12/04 380/52 |
| 8,143,995 B2* | 3/2012 | Soppera | H04L 9/3263 235/375 |

(Continued)

OTHER PUBLICATIONS

U.S. Appl. No. 12/504,596, "Advisory Action", dated Apr. 30, 2015, 6 pages.

(Continued)

*Primary Examiner* — Tae K Kim
*Assistant Examiner* — Peilang Pan
(74) *Attorney, Agent, or Firm* — Kilpatrick Townsend & Stockton LLP

(57) ABSTRACT

Techniques for authenticating the identity of shippers and receivers of goods at each point along a supply chain. A central hub repository issues shippers and receivers a pair of public and private keys for encrypting communications between the shippers and receivers and the hub repository and for authenticating the identity of shippers and receivers. The hub repository may also maintain a log of all transactions between shippers and receivers to provide an audit trail that may be used to track the progress of goods along a supply chain.

20 Claims, 12 Drawing Sheets

(56) References Cited

U.S. PATENT DOCUMENTS

| | | | | |
|---|---|---|---|---|
| 8,154,405 B2* | 4/2012 | Gravelle | | G06F 21/606 |
| | | | | 340/572.1 |
| 8,190,695 B2* | 5/2012 | Rekimoto | | G08C 17/02 |
| | | | | 455/420 |
| 9,013,266 B2* | 4/2015 | Griffiths-Harvey | | |
| | | | | H04L 9/3066 |
| | | | | 340/10.1 |
| 9,306,750 B2 | 4/2016 | Syngkon et al. | | |
| 2001/0037465 A1* | 11/2001 | Hart, III | | G06F 17/3089 |
| | | | | 726/28 |
| 2002/0052841 A1 | 5/2002 | Guthrie et al. | | |
| 2002/0087892 A1* | 7/2002 | Imazu | | G06F 21/31 |
| | | | | 726/6 |
| 2002/0095454 A1* | 7/2002 | Reed | | G06Q 30/0601 |
| | | | | 709/201 |
| 2002/0152123 A1* | 10/2002 | Giordano | | G06Q 20/04 |
| | | | | 705/14.33 |
| 2003/0097331 A1* | 5/2003 | Cohen | | G06Q 20/10 |
| | | | | 705/39 |
| 2003/0159051 A1* | 8/2003 | Hollnagel | | G06K 9/00 |
| | | | | 713/186 |
| 2004/0083184 A1* | 4/2004 | Tsuei | | G06Q 10/08 |
| | | | | 705/74 |
| 2004/0111370 A1* | 6/2004 | Saylors | | G06Q 20/10 |
| | | | | 705/40 |
| 2004/0122685 A1* | 6/2004 | Bunce | | G06Q 20/04 |
| | | | | 705/67 |
| 2004/0260653 A1* | 12/2004 | Tsuei | | C11D 17/0021 |
| | | | | 705/54 |
| 2005/0038718 A1* | 2/2005 | Barnes | | G06Q 10/087 |
| | | | | 705/28 |
| 2005/0058292 A1* | 3/2005 | Diorio | | G06K 7/0008 |
| | | | | 380/270 |
| 2005/0171898 A1* | 8/2005 | Bishop | | G06Q 20/00 |
| | | | | 705/39 |
| 2005/0289061 A1* | 12/2005 | Kulakowski | | G06Q 99/00 |
| | | | | 705/50 |
| 2006/0178986 A1* | 8/2006 | Giordano | | G06Q 20/04 |
| | | | | 705/40 |
| 2006/0200381 A1 | 9/2006 | Elkholy et al. | | |
| 2006/0278704 A1* | 12/2006 | Saunders | | G06Q 20/10 |
| | | | | 235/382 |
| 2007/0007358 A1* | 1/2007 | White | | G06F 21/606 |
| | | | | 235/492 |
| 2007/0017985 A1* | 1/2007 | Lapstun | | G06F 3/03545 |
| | | | | 235/435 |
| 2008/0069347 A1* | 3/2008 | Brown | | H04L 9/3066 |
| | | | | 380/45 |
| 2008/0094220 A1* | 4/2008 | Foley | | G06Q 20/327 |
| | | | | 340/572.4 |
| 2008/0116271 A1* | 5/2008 | Holz | | G06K 7/0004 |
| | | | | 235/435 |
| 2008/0129037 A1* | 6/2008 | Roth | | G06K 17/00 |
| | | | | 283/85 |
| 2008/0207296 A1* | 8/2008 | Lutnick | | G07F 17/32 |
| | | | | 463/16 |
| 2008/0215472 A1* | 9/2008 | Brown | | G06Q 20/10 |
| | | | | 705/35 |
| 2008/0244714 A1* | 10/2008 | Kulakowski | | G06Q 30/06 |
| | | | | 705/50 |
| 2009/0057421 A1* | 3/2009 | Suorsa | | G06Q 10/08 |
| | | | | 235/494 |
| 2009/0083833 A1* | 3/2009 | Ziola | | G06F 21/31 |
| | | | | 726/2 |
| 2009/0096574 A1* | 4/2009 | Oberle | | G06F 21/35 |
| | | | | 340/5.8 |
| 2009/0214038 A1* | 8/2009 | Wong | | G06K 7/0008 |
| | | | | 380/270 |
| 2009/0250514 A1* | 10/2009 | Wilds | | G06K 19/10 |
| | | | | 235/380 |
| 2009/0254971 A1* | 10/2009 | Herz | | G06Q 10/10 |
| | | | | 726/1 |
| 2009/0256679 A1* | 10/2009 | Potyrailo | | G06K 19/073 |
| | | | | 340/10.1 |
| 2009/0307767 A1* | 12/2009 | Semba | | G06F 21/34 |
| | | | | 726/18 |
| 2009/0315673 A1* | 12/2009 | Huang | | G06K 7/0008 |
| | | | | 340/5.61 |
| 2010/0019026 A1* | 1/2010 | Hochfield | | G06F 21/35 |
| | | | | 235/375 |
| 2010/0094830 A1* | 4/2010 | Speno | | G06Q 10/06 |
| | | | | 707/705 |
| 2010/0185865 A1* | 7/2010 | Yeap | | G06F 21/43 |
| | | | | 713/176 |
| 2010/0283614 A1* | 11/2010 | Soppera | | G06F 21/445 |
| | | | | 340/572.4 |
| 2010/0318468 A1 | 12/2010 | Carr et al. | | |
| 2011/0006878 A1* | 1/2011 | Nyffeler | | G06K 19/0723 |
| | | | | 340/5.8 |
| 2011/0016318 A1 | 1/2011 | Syngkon et al. | | |
| 2011/0035604 A1* | 2/2011 | Habraken | | G06F 21/32 |
| | | | | 713/193 |
| 2012/0102322 A1* | 4/2012 | O'Brien | | H04L 9/3271 |
| | | | | 713/168 |
| 2013/0206837 A1* | 8/2013 | Szu | | G06K 7/10257 |
| | | | | 235/449 |
| 2016/0173457 A1* | 6/2016 | Syngkon | | G06Q 10/08 |
| | | | | 705/50 |

OTHER PUBLICATIONS

U.S. Appl. No. 12/504,596, "Final Office Action", dated Feb. 4, 2015, 19 pages.

U.S. Appl. No. 12/504,596, "Non-Final Office Action", dated Sep. 9, 2014, 19 pages.

U.S. Appl. No. 12/504,596, "Non-Final Office Action", dated Jun. 4, 2015, 21 pages.

U.S. Appl. No. 12/504,596, "Notice of Allowance", dated Nov. 25, 2015, 8 pages.

U.S. Appl. No. 12/504,596, "Office Action", dated May 24, 2012, 11 pages.

U.S. Appl. No. 12/504,596, "Office Action", dated Oct. 25, 2012, 12 pages.

\* cited by examiner

Reader Hardware

Hub Hardware

SHIP501:COMPANY012:FACILITY008:READER990:RECEIVER723: SOURCE156:DESTINATION888
510   520   530   540   550   560   570

TECHNIQUES FOR SECURING SUPPLY CHAIN ELECTRONIC TRANSACTIONS

CROSS-REFERENCES TO RELATED APPLICATIONS

The present application is a continuation of U.S. patent application Ser. No. 12/504,596 filed Jul. 16, 2009, entitled "TECHNIQUES FOR SECURING SUPPLY CHAIN ELECTRONIC TRANSACTIONS," the entire contents of which are incorporated herein by reference for all purposes.

BACKGROUND

The present invention relates to supply chain management and more particularly to techniques for authenticating the shipment and receipt of goods along a supply chain by legitimate parties.

Goods may move along a complex supply chain from the manufacturer to consumers, where goods may be handled by multiple third parties, such as distributors and retailers, along the supply chain between the manufacturer and the consumer. Goods may be stolen, altered, or contaminated along the supply chain or counterfeit goods may be introduced into the supply chain by unscrupulous third parties.

Conventional supply chain management systems do not provide techniques for determining the identity of shippers and receivers of goods along a supply.

BRIEF SUMMARY

Techniques for authenticating the identity of shippers and receivers of goods at each point along a supply chain are provided. A central hub repository issues shippers and receivers a pair of public and private keys for encrypting communications between the shippers and receivers and the hub repository and for authenticating the identity of shippers and receivers. The hub repository may also maintain a log of all transactions between shippers and receivers to provide an audit trail that may be used to track the progress of goods along a supply chain.

According to an embodiment, a computer readable medium storing a plurality of instructions for controlling a data processor to perform one or more tasks is provided. The plurality of instructions include an instruction that causes the data processor to receive a first encrypted transaction data for a shipment of goods from a shipper of the goods, the transaction information identifying the goods being shipped, the first encrypted transaction data being encrypted using a private encryption key associated with the shipper, and an instruction that causes the data processor to decrypt the first encrypted transaction data at the hub using a public encryption key associated with the shipper of the goods to authenticate the sender of the goods. The plurality of instructions further include an instruction that causes the data processor to receive a second encrypted transaction data from a receiver of the goods, the second encrypted transaction data being encrypted using private encryption key of the receiver of the goods, and an instruction that causes the data processor to decrypt the second encrypted transaction data at the hub using a public encryption key associated with the receiver of the goods to authenticate the receiver of the goods. The instructions also include an instruction that causes the data processor to reject the transaction if authentication of one or more of the sender or the receiver of the goods failed.

According to another embodiment, a system for authenticating a transaction in a supply chain is provided. The system includes a processor and a computer-readable memory storing a plurality of instructions for controlling the processor to perform one or more tasks. The instructions include an instruction that causes the processor to receive a first encrypted transaction data for a shipment of goods from a shipper of the goods, the transaction information identifying the goods being shipped, the first encrypted transaction data being encrypted using a private encryption key associated with the shipper, and an instruction that causes the processor to decrypt the first encrypted transaction data at the hub using a public encryption key associated with the shipper of the goods to authenticate the sender of the goods. The instructions also include an instruction that causes the processor to receive a second encrypted transaction data from a receiver of the goods, the second encrypted transaction data being encrypted using private encryption key of the receiver of the goods, and an instruction that causes the processor to decrypt the second encrypted transaction data at the hub using a public encryption key associated with the receiver of the goods to authenticate the receiver of the goods. The instructions further include an instruction that causes the processor to reject the transaction if authentication of one or more of the sender or the receiver of the goods failed.

According to yet another embodiment, a computer-implemented method for authenticating a transaction in a supply chain is provided. The method includes receiving at a secure hub a first encrypted transaction data for a shipment of goods from a shipper of the goods, the transaction information identifying the goods being shipped, the first encrypted transaction data being encrypted using a private encryption key associated with the shipper, and decrypting the first encrypted transaction data at the hub using a public encryption key associated with the shipper of the goods to authenticate the sender of the goods. The method further includes receiving, at the hub, a second encrypted transaction data from a receiver of the goods, the second encrypted transaction data being encrypted using private encryption key of the receiver of the goods, and decrypting the second encrypted transaction data at the hub using a public encryption key associated with the receiver of the goods to authenticate the receiver of the goods. The method further includes rejecting the transaction if authentication of one or more of the sender or the receiver of the goods failed.

Other features and advantages of the invention will be apparent in view of the following detailed description and preferred embodiments.

BRIEF DESCRIPTION OF THE DRAWINGS

Embodiments of the invention are described here, with reference to the figures. Where elements of the figures are called out with reference numbers, it should be understood that like reference numbers refer to like elements and might or might not be the same instance of the element.

DETAILED DESCRIPTION

Figure 1:
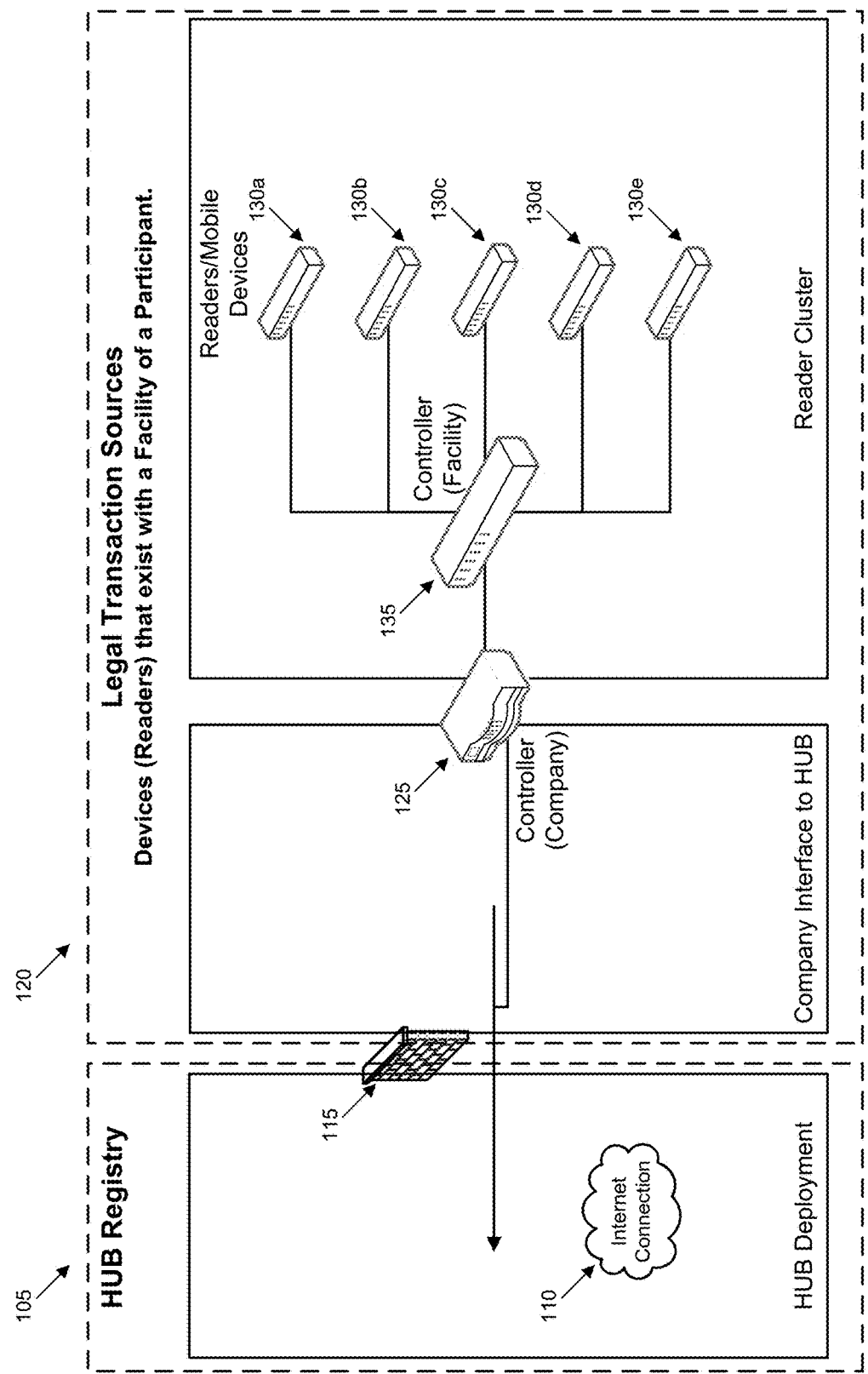
FIG. 1 is a high level block diagram of an electronic secure supply chain system according to an embodiment.

In the following description, for the purposes of explanation, specific details are set forth in order to provide a thorough understanding of the invention. However, it will be apparent that the invention may be practiced without these specific details.

Embodiments of the present invention provide techniques for authenticating the identity of shippers and receivers of goods along a supply chain. A party that ships the goods is referred to herein as the sender and a party that receives the goods is referred to herein as the receiver. Shippers and receivers of goods use reader devices to scan tags associated with goods before the goods are shipped and as the goods are received. The tags include a unique identifier that is used to track the shipment along the supply chain. The reader devices are registered with a hub repository and the hub repository issues a pair of encryption keys to each reader device: a public key that may be shared with other shippers and receivers along the supply chain, and a secret private key that is provided only to the shipper or receiver associated with the key.

Before shipping goods, a sender or shipper of goods scans a tag associated with the goods to be shipped to read the unique identifier from the tag using a reader device. The reader device may be located at the facility from where the goods are to be shipped. The identifier associated with the goods enables the goods to be tracked from point to point along a supply chain, since each shipment will have a unique identifier associated only with that shipment. The identifier associated with the shipment is referred to herein as an "Auto-ID." The Auto-ID may be incorporated into various types of tags that may be scanned and read by a reader devices. According to some embodiments, the tag may be a barcode, an RFID tag, or a data storage medium, such as a magnetic strip.

The sender encrypts transaction information related to the goods being shipped using the private key associated with the reader device, including the unique identifier of the goods to be shipped. The transaction information may include various information about goods included in the shipment, such as description of the goods, identifiers for the shipper of the goods and the intended receiver of the goods, a quantity of the goods, information about the manufacturer of the goods, an expiration date for the goods (if the goods are perishable), and/or other information. The sender of the goods then transmits the encrypted transaction information to the hub registry for authentication and to create an audit trail for the goods. The hub registry may add all or part of the decrypted transaction information to the audit history of the shipment of goods. The shipper may also send the encrypted transaction information to the intended receiver of the goods.

Upon receiving the shipment of goods, the receiver of the goods scans the tag associated with the incoming shipment of goods using a reader device to read the unique identifier from the tag. The reader device then encrypts a set of transaction information, including the unique identifier read from the tag of the incoming shipment, using a private key associated with the reader device, and the encrypted transaction information is transmitted to the hub registry for authentication. The transaction information may include additional information about the shipment, such as an identifier of the shipper of the goods, the quantity of goods received, and/or other information related to the transaction.

The audit log of the hub registry can be used to create a chain of custody for the goods back to their source along the supply chain, enabling the origin of the goods to easily be established. Should a problem with a shipment occur, such as contamination or damage to goods, the audit history of the hub repository can be used to establish which parties handled the goods and may be used to track problems back to their source. The shippers and receivers of the goods along the supply chain cannot Numerous industries may benefit from the authentication techniques disclosed herein for ensuring the provenance of goods. For example, the pharmaceutical industry may utilize these techniques to help prevent counterfeit pharmaceuticals from entering the supply chain and for tracking sources of contamination to pharmaceuticals. By tracking pharmaceuticals from the point of manufacture to the point of sale to consumers (e.g. retailer or pharmacy that sells the drug to consumers), the likelihood of a consumer receiving counterfeit or contaminated drugs may be significantly reduced. As another example, luxury goods manufacturers may utilize these techniques to prevent counterfeit goods from entering the supply chain and being passed off as goods produced by the luxury goods manufacturers. Food and beverage manufacturers may utilize these techniques to ensure that food products and/or ingredients come from the sources that they are purported to come from and may facilitate the tracking of source of contamination. For example, if melamine or other contaminants are identified in a foodstuff, the source of the contamination may be traced back to a specific manufacturing plant or source of raw materials. Toy manufacturers may also use these techniques to ensure that raw materials used in children's toys do not contain toxic materials. For example, if lead paint is identified in toys produced by a particular manufacturer, the manufacturer may be able to trace the source of the contamination back to the manufacturing plant that produced the contaminated toys or to the source of the paint that included the lead.

FIG. 1 is a high level block diagram of an electronic secure system for a supply chain according to an embodiment. The electronic secure system includes a hub registry 105 and legal transaction sources 120. Legal transaction sources 120 may include reader devices of shippers and/or receivers of goods that have been registered with hub registry 105. Hub registry 105 is configured to register shippers and receivers of goods along a supply chain, to authenticate transactional information associated with a shipment of goods along the supply chain, and to provide an audit history of the transactional information to ensure that the goods were shipped and received by the shippers and receivers that were authorized to have handled the goods. The audit history prevents a shipper or receiver from later repudiating that the goods were shipped or received by the shipper or receiver. For example, if a particular set of goods is found to have been contaminated, damaged, or otherwise compromised, the shippers and receivers of the goods along the supply chain cannot repudiate having shipped or received the goods, because hub registry 105 authenticates transactional information received from the shippers and receivers at each point along the supply chain.

A legal transaction source 120 may be a shipper and/or a receiver of goods along a supply chain that has been registered with hub registry 105. Legal transaction sources 120 may include a company controller 125, one or more facility controllers 135, and one or more tag reader devices 130a-130e associated with each facility controller. Company controller 125 provides an interface for communicating with hub registry 105 via a network, such as the Internet. A shipper and/or receiver of goods may have more multiple facilities for processing shipments goods, and each facility may have a facility controller 135. For example, a manufacturer of a pharmaceutical product may have multiple manufacturing facilities from which the pharmaceutical may be shipped. Each of the manufacturing facilities may have a facility controller 135 under the control of company controller 125.

A facility may have multiple tag reader devices 130a-130e. The reader devices 130a-130e may be used to read identification tags associated with shipments of goods being shipped from the facility or to the facility. The identification tags associated with a shipment include a unique identifier that may be used to track that shipment of goods along the supply chain. In an embodiment, an identification tag associated with a shipment of goods may be in the form of a radio frequency identification (RFID) tag. One or more of the tag readers may scan the tag associated with a shipment of goods, encrypt the unique identifier associated with the tag, and transmit the encrypted information to hub registry 105 using a private encryption key issued by hub registry 105 for the reader device. In an embodiment, tag readers 130a-130e may comprise a handheld device that may be used by shipment fulfillment staff in a facility for reading the identification tags of incoming and/or outgoing shipments of goods.

In one embodiment, a network address, such as an Internet Protocol (IP) address, a Media Access Control (MAC) address, and/or a physical address (e.g., a street address of the company or facility receiving or shipping goods in a supply chain) associated with company controller 125 are registered with hub registry 105. Similar information may be registered for facility controller 135. As describe above, a company may have multiple facilities, and thus, may have multiple facility controllers 135 to be registered with hub registry 105. According to some embodiments, a company may only have a single facility, a thus, only have company controller 125.

A network address and/or a MAC address for each reader device 130a-130e and a facility with which the reader device is located is also registered with hub registry 105. In some embodiments, a list of valid MAC addresses associated with reader devices for a particular facility may be provided to hub registry 105 during a registration process. The MAC address associated with a reader device may be used in environments where the network address of the reader device may not remain constant. For example, in some environments, a reader device may be issued a new IP address if the device the device is rebooted or powered down. Thus, in such an environment, the network address of the reader device may change over time. The MAC address that is associated with the physical hardware of the reader device however does not change if the device is rebooted or powered down. In an embodiment, the domain and subnet of the network address of a reader device may be used to verify that the reader device is associated with a particular company controller 125 and/or facility controller 135.

Legal transaction sources 120 illustrates one possible configuration for a company acting as a shipper and/or receiver of goods in a supply chain. One skilled in the art will recognize that other configurations are possible.

Hub registry 105 may include one or more servers for storing registration information related to registered shippers and/or receivers, such as the physical addresses of facilities of shippers and/or receivers and the network or MAC addresses of controllers and/or reader devices 130a-130e used by the shippers and/or receivers in the supply chain. Hub registry 105 includes a network interface 110 for communicating with company controller 125 across a network, such as the Internet. Hub registry 105 may also include a firewall 115 used to control access to hub registry 105.

An identification tag, such as a radio-frequency identification (RFID) tag may be affixed to shipments of goods for the purpose of tracking the shipments along a supply chain. The data capacity of an RFID tag may be large enough that each individual RFID tag may include a unique identifier that can be used to distinguish that RFID tag from other RFID tags. An RFID tag may also include a writeable portion of memory for storing data, such as encrypted transactional information used to track the progress of goods along a supply chain. In some embodiment, the identification tag may be in the form of a barcode rather than an RFID tag. The barcode tag may be affixed to a shipment and used to tack progress of the shipment in the supply chain.

Figure 2:
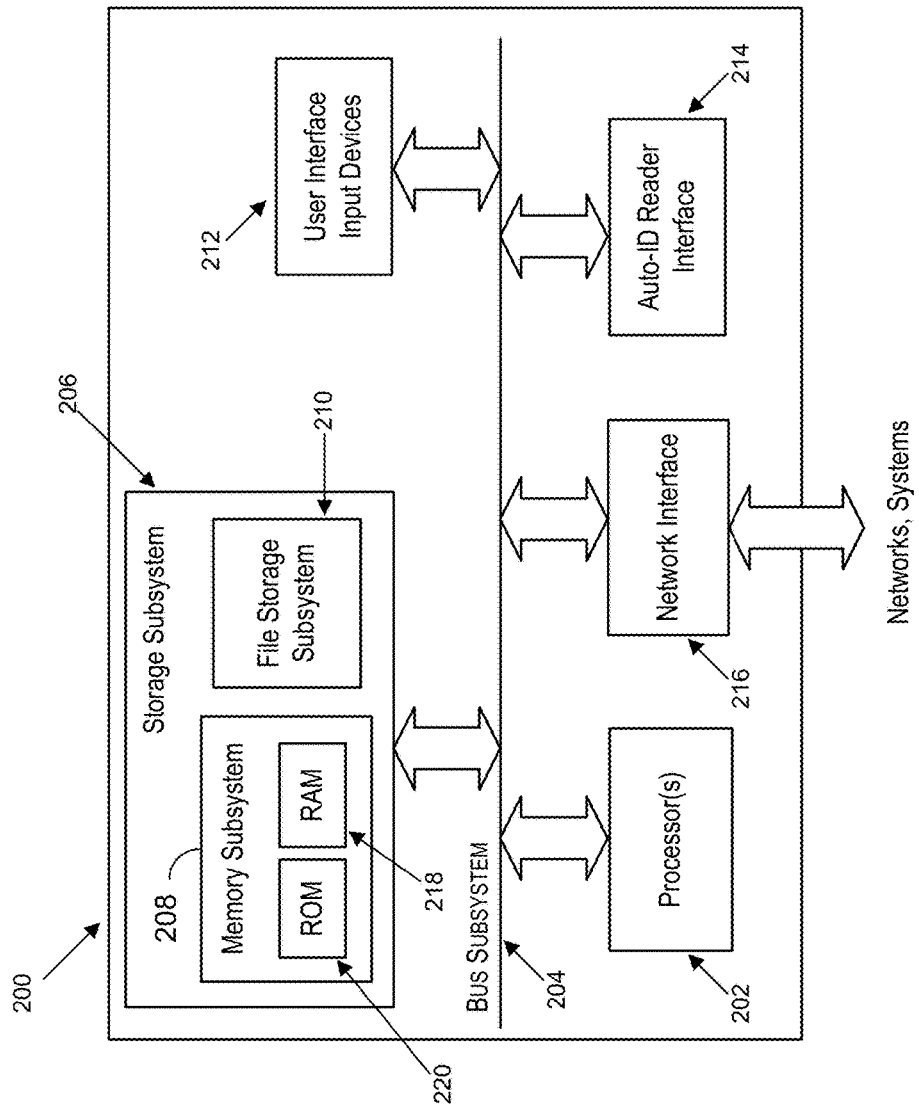
FIG. 2 is a block diagram of a tag reader according to an embodiment.

FIG. 2 is a simplified block diagram of reader device 200 according to an embodiment. Reader device 200 may be used to read the RFID tag associated with goods being shipped. In one embodiment, reader device 200 may be a portable handheld device. In another embodiment, reader device 200 may be a component of a shipping/receiving facility that reads the tags of goods entering/leaving the shipping/receiving facility. In one embodiment, reader device 200 may include a barcode reader capable of reading barcodes.

As shown in FIG. 2, reader device 200 includes a processor 202 that communicates with a number of peripheral subsystems via a bus subsystem 204. These peripheral subsystems may include a storage subsystem 206, comprising a memory subsystem 208 and a file storage subsystem 210, user interface input devices 212, Auto-ID reader interface 214, and a network interface subsystem 216.

Bus subsystem 204 provides a mechanism for letting the various components and subsystems of reader device 200 communicate with each other as intended. Although bus subsystem 204 is shown schematically as a single bus, alternative embodiments of the bus subsystem may utilize multiple busses.

Network interface subsystem 216 provides an interface to other computer systems, networks, and portals. Network interface subsystem 216 serves as an interface for receiving data from and transmitting data to other systems from reader device 200. For example, reader device 200 may wireless transmit information to a server, such as data read from an RFID tag, or receive information from a server, such as facility controller 135.

Auto-ID reader interface 214 may include an interface for reading information from RFID tags. Some RFID tags include an integrated circuit for storing and processing information as well as modulating and demodulating radio frequency (RF) signals, as well as other functions, and an antenna for receiving and transmitting RF signals. Active RF tags also include a power source, such as a battery, and can transmit a signal autonomously, and Auto-ID reader interface 214 can receive and translate this signal into data that can be interpreted and used by reader device 200. Other RF tags are passive, and do not include a power source. Passive RF tags convert RF signals received from reader device 200 to power the tag and transmit signal back to reader device 200. The signal transmitted from the tag may include a read-only unique tag identifier assigned to the tag that provides a unique identifier for the tag as well as additional data, such as encrypted transaction information used track the progress of the goods associated with the tag along a supply chain.

Storage subsystem 206 provides a computer-readable storage medium that may be configured to store the basic programming and data constructs that provide the functionality. Software (code modules or instructions) that provides at least some of the functionality of the present invention may be stored in storage subsystem 206. These software modules or instructions may be executed by processor(s) 202. Storage subsystem 206 provides a computer-readable storage medium a repository for storing data used in accordance with the present invention. Storage subsystem 206 may comprise memory subsystem 208 and file/disk storage subsystem 210. Storage subsystem 206 may also be used to store a network address for reader device 200, such as an Internet Protocol (IP) address. The IP address of the reader may be used to identify the reader to the hub registry 105. In some embodiments, a hardware-related identifier, such as a Media Access Control (MAC) address associated with network interface subsystem 216 may be used to uniquely identify reader device 200 to hub registry 105. The MAC address of network interface subsystem 216 may be used in some instances where the network address assigned to a reader may change periodically.

According to some embodiments, a sender and/or receiver of goods may provide a list of "legal" network addresses or hardware-related identifiers, such as MAC addresses to hub registry 105. If reader device from a particular sender or receiver is to be registered, the device may be assigned a network address from the list of addresses provided to hub registry 105 by the particular sender or receiver. If a hardware-based identifier, such as a MAC address, is to be used, a device having a MAC address on the list may be have been registered in advance.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Reader device 200 is merely illustrates one possible configuration for a reader device may also include omit some components described herein and may include other components. Reader device 200 can be of various types including a personal computer, a portable computer, a workstation, a network computer, a mainframe, a kiosk, a server or any other data processing system. According to some embodiments, some reader device 200 may defer some or all data processing functions to an external server computer system (not shown). Due to the ever-changing nature of computers and networks, the description of reader device 200 depicted in FIG. 2 is intended only as a specific example for purposes of illustrating the an embodiment of a system that may be used to implement the present invention. Many other configurations having more or fewer components than the system depicted in FIG. 2 are possible.

Figure 3:
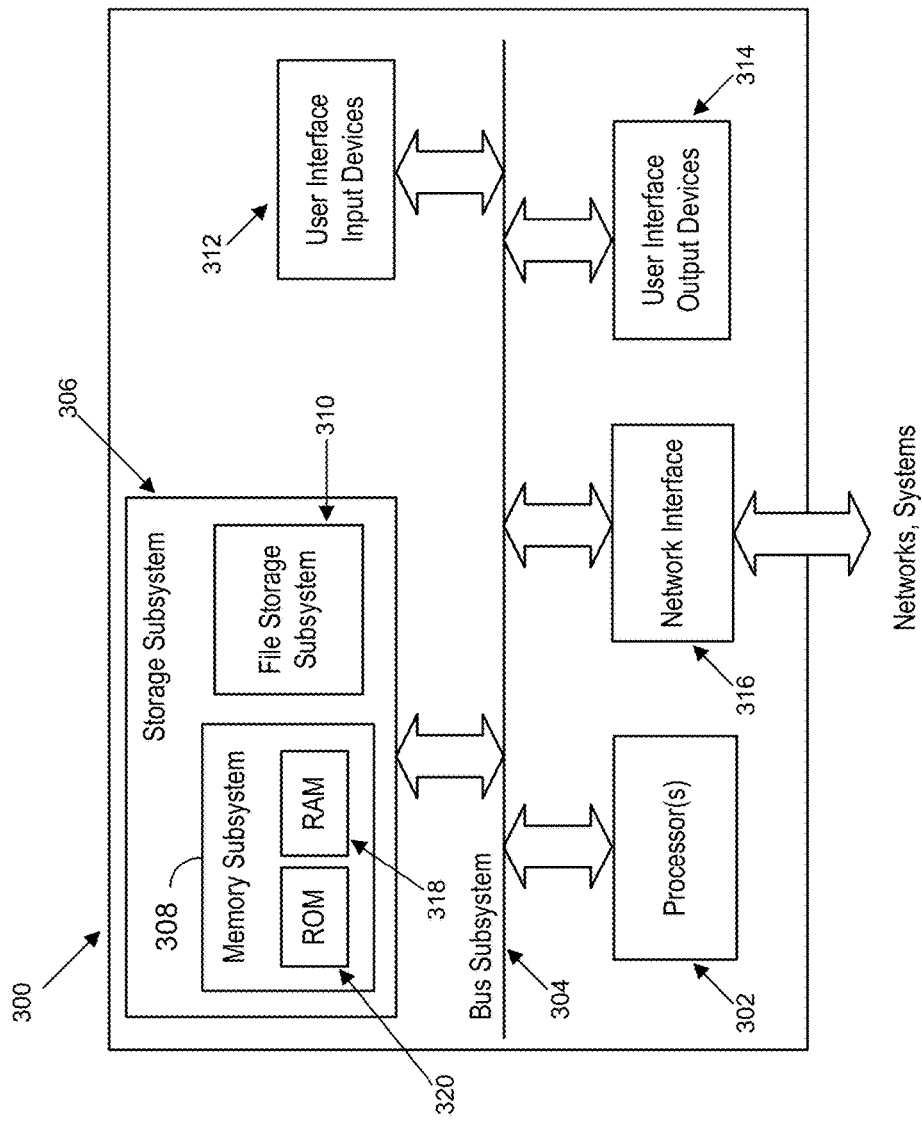
FIG. 3 is a block diagram of a computer system that may be used to implement a hub according to an embodiment.

FIG. 3 is a block diagram of computer system 300 that may be used to implement a hub registry 105 according to an embodiment. As shown in FIG. 3, computer system 300 includes a processor 302 that communicates with a number of peripheral subsystems via a bus subsystem 304. These peripheral subsystems may include a storage subsystem 306, comprising a memory subsystem 308 and a file storage subsystem 310, user interface input devices 312, user interface output devices 314, and a network interface subsystem 316.

Bus subsystem 304 provides a mechanism for letting the various components and subsystems of computer system 300 communicate with each other as intended. Although bus subsystem 304 is shown schematically as a single bus, alternative embodiments of the bus subsystem may utilize multiple busses.

Network interface subsystem 316 provides an interface to other computer systems, networks, and portals. Network interface subsystem 316 serves as an interface for receiving data from and transmitting data to other systems from computer system 300.

User interface input devices 312 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 300.

User interface output devices 314 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 300.

Storage subsystem 306 may be configured to store the basic programming and data constructs that provide the functionality. Software (code modules or instructions) that provides at least some of the functionality of the present invention may be stored in storage subsystem 306. These software modules or instructions may be executed by processor(s) 302. Storage subsystem 306 may also provide a repository for storing data used in accordance with the present invention. Storage subsystem 306 may comprise memory subsystem 308 and file/disk storage subsystem 310.

Memory subsystem 308 may include a number of memories including a main random access memory (RAM) 318 for storage of instructions and data during program execution and a read only memory (ROM) 320 in which fixed instructions are stored. File storage subsystem 310 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 300 can be of various types including a personal computer, a portable computer, a workstation, a network computer, a mainframe, a kiosk, a server or any other data processing system. Due to the ever-changing nature of computers and networks, the description of computer system 300 depicted in FIG. 3 is intended only as a specific example for purposes of illustrating the an embodiment of a computer system that may be used to implement the present invention. Many other configurations having more or fewer components than the system depicted in FIG. 3 are possible.

Figure 4:
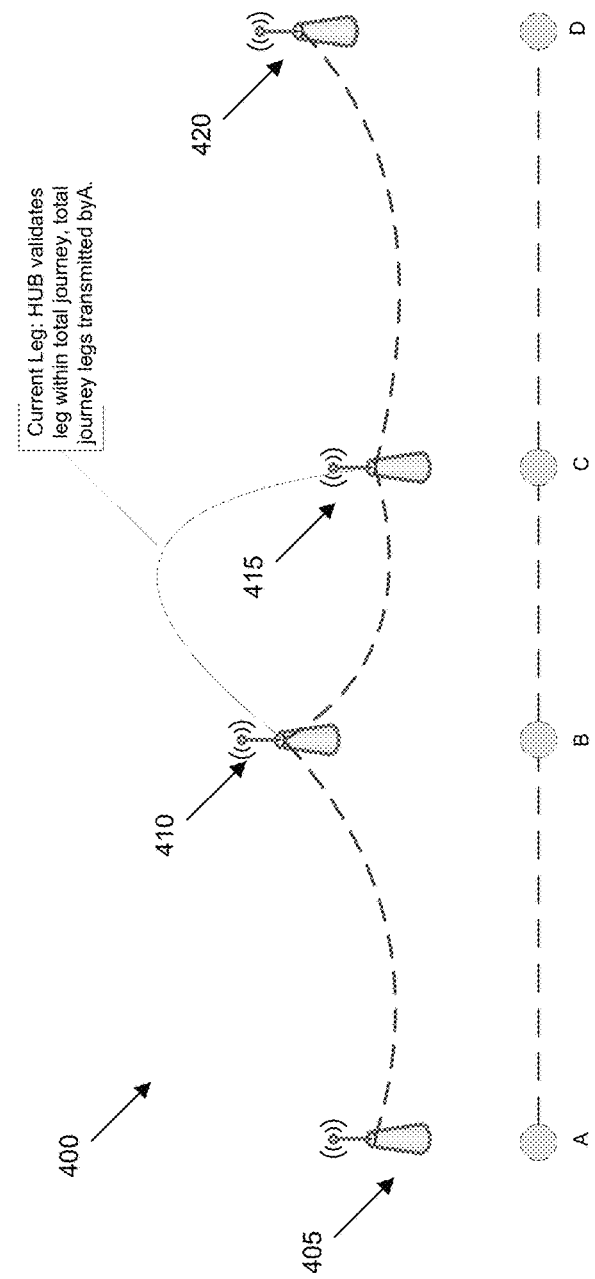
FIG. 4 is a high level block diagram illustrating the steps in a supply chain using an electronic secure supply chain system according to an embodiment.

FIG. 4 is a high level block diagram illustrating a method of tracking the movement of a shipment in a supply chain 400 using an electronic secure system according to an embodiment. Supply chain 400 is a multistep supply chain with goods originating at facility A (405) being shipped to facility B (410) in a first transaction, the goods are then shipped from facility B to facility C (415) in a second transaction, and the goods are then shipped from facility C to facility D (420) in a third transaction. For each transaction in the supply chain, the identity of the shipper and the receiver are authenticated by hub registry 105, and the shipment and receipt of the goods is logged so that the parties involved in each transaction cannot later repudiate the transaction. The goods are tracked using a tag associated with the shipment of goods, the tag storing an Auto-ID or other unique identifier associated with the shipment. Transaction information, such as a description of the goods, the quantity of the goods, the source of the goods, and the intended recipient of the goods may also be provided for each transaction in the supply chain.

The transaction information, including the unique identifier of the goods, is signed and encrypted using a private key of a reader device at the shipping facility and transmitted to the hub registry for authentication. The hub receives the encrypted transaction information and decrypts the transaction information using the public key of the reader device of the shipping facility that was used to scan the goods before being shipped. The private key of the reader device is known only to the hub registry and the shipping facility. In some embodiments, the hub registry generates public and private key pairs for reader devices. If the hub is able to successfully decrypt the transaction information using the public key of the shipper, then the identity of the shipper has been successfully authenticated. If the hub cannot decrypt the transaction information using the public key of the shipper, then the transaction information may have been altered and the transaction is rejected and various exception handling procedures (described below) may be executed.

A receiving facility receives the encrypted transaction from the shipper and decrypts the shipment information using the public key of the shipper. The receiving facility also signs and encrypts a copy of the transaction information received from the shipper that is already signed and encrypted by the shipper. The receiving facility signs and encrypts the transaction information using a private key provided to the receiving facility by the hub.

FIG. 4 merely illustrates one possible configuration for a supply chain. In other embodiments, the number of shippers and/or receivers may vary.

Figure 5:
FIG. 5 illustrates a sample transaction information according to an embodiment.

FIG. 5 illustrates sample transaction information according to an embodiment. Transaction information associated with a shipment of goods is encrypted by each shipper along the supply chain and each receiver along the supply chain and provided to hub registry 105 for authentication. The transaction information may include various information related to the shipment of good, such as unique shipment id, a company identifier, facility identifier, reader device identifier associated with shipper of the goods, and other information. The transaction information may also include a source from which the shipment originated if the goods originated from a shipper further up the supply chain, and a final destination for the shipment if the receiver of the shipment is not the final destination for the shipment.

The transaction information illustrated in FIG. 5 represents a single transaction within a supply chain, where goods are being shipped from a sender to a receiver. The transaction information includes a shipment identifier 510, a unique shipment identifier associated with the shipment. The transaction information also include a company identifier 520, that identifies the shipper of the goods, facility identifier 530, that identifies the facility from which the goods were shipped, and reader identifier 540 that identifies the reader device that was used to scan the shipment of goods out from the shipper's facility. The transaction information also includes a receiver identifier 550 that identifies the intended recipient of the shipment. The transaction information also includes a source identifier 560 that identifies the original source of the goods. As indicated above, a shipper may merely be one stop along a supply chain, and a shipment of goods may have originated from a source farther up the supply chain. Source identifier 560 identifies this original source of the goods. The transaction information also includes destination identifier 570 that represents the ultimate destination intended for the goods along the supply chain. The receiver of the goods may be the ultimate destination of the goods along the supply chain, in which case, the receiver identifier 550 and destination identifier 570 would both have the same value.

Figure 6:
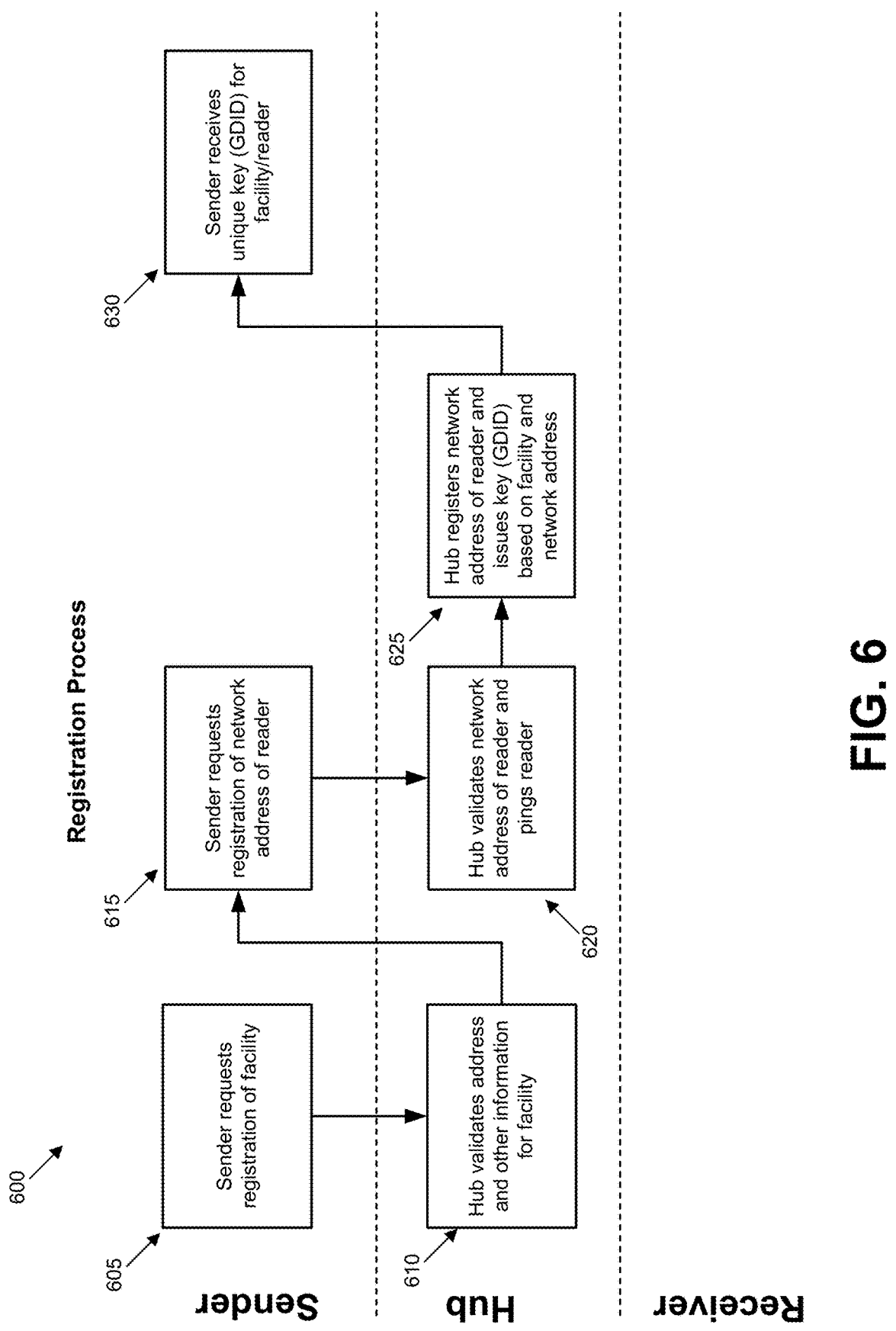
FIG. 6 is a high flow diagram of a process for registering a facility and reader hardware for a sender of goods in a supply chain with the hub of an electronic secure supply chain system according to an embodiment.

FIG. 6 is a high level flow diagram of a process 600 for registering a facility and reader hardware for a sender/shipper of goods in a supply chain with the hub of an electronic secure supply chain system according to an embodiment. A sender/shipper of goods sends a request to register a facility of the sender/receiver facility to hub registry 105 (step 605). The request may include information identifying the sender/shipper of goods and a physical address of the facility, and/or other information that may be used to identify a physical or geographic location of the facility.

The hub then validates the physical address of the facility and other information related to the facility received in the request (step 610). For example, the hub may access an address verification product to verify that the physical address provided for the facility is valid. Numerous address verification services and software products are available that may be used to verify a mailing address or physical address of a facility. Verification of the physical address of the facility from which goods are to be shipped may be done automatically by hub registry 105 by accessing an address verification service to verify that the address provided by the sender is a valid mailing address. Additional automatic and/or manual verification steps may also be performed to verify that the sender has possession of a facility at the physical address provided. For example, in an embodiment, the sender may provide additional verification information to the hub, such as copies of commercial leases or other information that may be used to verify that the sender possesses the facility. After validating the physical address and/or other information for the facility, the facility is registered with the hub registry 105. Hub registry 105 may maintain a data store that includes a listing of all facilities that have been registered with hub registry 105.

Once a facility has been registered with the hub, the sender may register one or more reader devices 130 associated with the facility with hub registry 105. Only registered reader devices will be able to participate in authenticated transactions. Transactions from unregistered reader devices will be rejected by hub registry 105.

In one embodiment, as part of registering a reader device, the sender sends a network address of a reader device, such as an IP address, to hub registry 105 for registration (step 615). In some embodiments, the sender may provide a hardware-specific identifier for the reader device, such as a MAC address instead of or in addition to the network address of the reader device. As previously described, a MAC address or other hardware-specific identifier may be used in some embodiments where the network address assigned to a reader device may change over time. For example, in some embodiments, network addresses may be dynamically assigned to reader devices, and if a reader device is rebooted or reset, the reader device may be allocated a new network address.

The hub receives and validates the network address of the reader device (step 620). The hub may use domain and subnet information of the network address to determine whether the network address of the reader device belongs to the sender. According to some embodiments, the domain and subnet information of the network address for the reader device may be verified to ensure that the network address corresponds to the company and/or the facility to which the reader device is supposed to be associated. According to some embodiments, hub registry 105 may also ping the reader device to device to determine whether the reader device is reachable across the public network (e.g., the Internet) from the hub. According to an embodiment, the MAC address of the reader device may be verified by comparing the MAC address of the reader device to a list of valid MAC addresses that has been provided in advance by the sender. If the MAC address of the reader device being registered matches a MAC address on this list, the device may be registered. If the MAC address of the reader device does not match a MAC address on the list, the reader device may not be registered.

After validating the network address (or MAC address) of the reader device, the hub registers the network address (or MAC address) of the reader device and generates a set of public and private keys specific to the reader device based on the network address (or MAC address) of the reader device (step 625). As part of 625, the hub may use a facility identifier for the facility with which the reader device is associated in generating the public and private keys. The private key is also referred to herein as a Global Device ID (GDID). The hub transmits the public and private keys associated with the reader to the sender, and the sender receives the public and private keys for the reader device (step 630).

As described above, the public key may be used to decrypt data encrypted using the private key and the private key may be used to decrypt data encrypted with the public key. The private key is kept secret and should only be known to the hub registry 105 and the sender and/or receiver to whom the private key is issued. The reader device at the sender's facility uses the private key issued to that device to sign and encrypt transaction information that the reader device sends to the hub and/or to any receivers along the supply chain that may receive shipments from the sender. The public key may be shared with other registered senders and/or receivers along the supply chain, and may be used to by the other registered senders and/or receivers to decrypt and authenticated transaction information signed and encrypted by the sender using the private key associated with the reader device used to scan the out the goods prior to shipment. According to some embodiments, hub registry 105 may provide a directory of public keys for each registered sender and/or receiver. The public key for a particular reader device may be obtained by looking up the reader in the directory.

According to an embodiment, the private key associated with a reader device may be transmitted electronically by hub registry 105 in an encrypted form. For example, hub registry may send an email message to the sender and/or receiver to whom the private key is issued with the private key included with the email as an encrypted attachment. According to some embodiments, a sender and/or receiver of goods may be issued a company-specific set of public and private keys (applies to all facilities of the sender and/or receiver) by hub registry 105 that may be used to encrypt decrypt communications between the hub registry 105 and the sender and/or receiver of goods. Hub registry 105 may use the company-specific public key to encrypt private keys associated with reader devices to be transmitted to the sender and/or receiver to minimize the risk of an unauthorized third party intercepting the private keys being associated with reader devices. Only the sender and/or receiver of goods having the corresponding company-specific private key should be able to decrypt the encrypted private keys using this technique.

The company-specific private key associated generated by hub registry 105 may be provided to the sender and/or receiver of goods on a computer-readable medium, such as a flash drive, CD-ROM, or the like, to reduce the likelihood that the key could be intercepted by an unauthorized entity. The computer-readable medium storing the company-specific private key may be sent to the sender and/or receiver of goods to whom the company-specific private key has been issued via a conventional mail or package delivery service. Once the sender and/or receiver of goods has been provided the company-specific private key, hub registry may encrypt subsequent electronic communications with the sender and/or receiver of goods using the company-specific private key.

As described above, a sender may have more than one facility from which goods may be shipped, and each facility may have a facility controller 135. In an embodiment, where a sender has multiple facilities, the sender may provide information about multiple facilities to the hub registry 105 in step 605.

Figure 7:
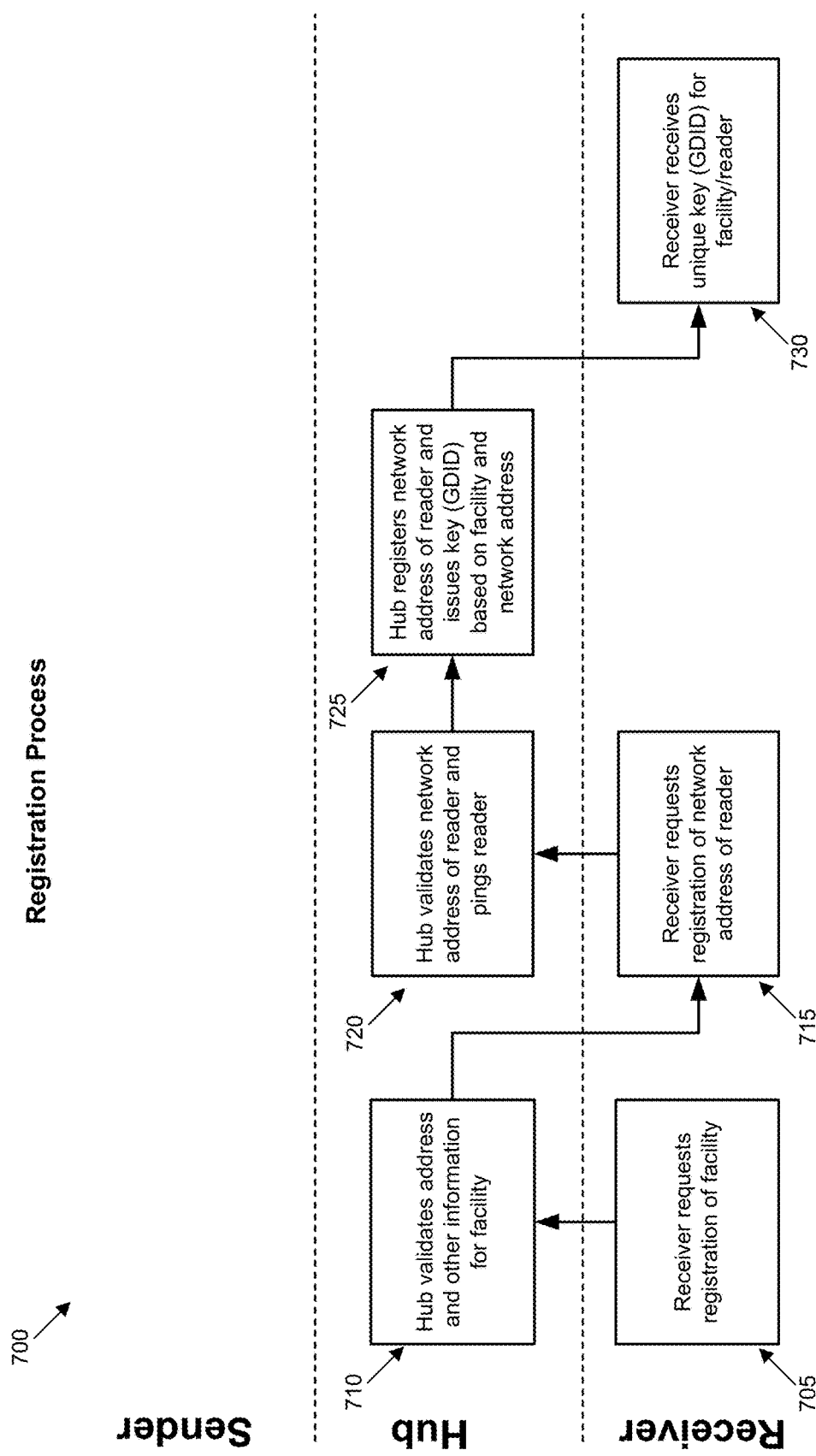
FIG. 7 is a high level flow diagram of a process for registering a facility and reader hardware for a receiver of goods in a supply chain with the hub of an electronic secure supply chain system according to an embodiment.

FIG. 7 is a high flow diagram of a process 700 for registering a facility and reader hardware for a receiver of goods in a supply chain with the hub of an electronic secure supply chain system according to an embodiment. Process 700 for registering a facility and reader hardware for a receiver of goods mirrors process 600 for registering a facility and reader hardware for a sender of goods, described above. According to some embodiments, a sender of goods may also be a receiver of goods (e.g., a sender not at the beginning of a supply chain). In the event that a sender of goods is also a receiver, either process 600 or process 700 might be used to register the facility and reader devices for the sender/receiver.

A receiver requests that the hub register a facility of the receiver at which goods shipped in a supply chain are to be received (step 705). The request may include an identifier for the receiver and may include a physical address of the facility at which goods are to be received. The hub then validates the physical address of the facility and other information related to the facility (step 710). For example, the hub may access an address verification service for verifying that a physical address provided for the facility is valid. Verification of the physical address of the facility at which goods are to be received may be done automatically by hub registry 105 by accessing an address verification service to verify that the address provided by the sender is a valid mailing address. Additional automatic and/or manual verification steps may also be performed to verify that the sender has possession of a facility at the physical address provided. For example, in an embodiment, the receiver may provide additional verification information may be provided to the hub, such as copies of commercial leases or other information that may be used to verify that the sender is in possession of the facility. After validating the physical address and/or other information for the facility, the facility is added to the hub registry 105.

Once the facility has been registered with hub registry 105, the receiver may register one or more reader devices 130 with hub registry 105. Only registered reader devices will be able to participate in authenticated transactions. Transactions from non-registered reader device will be rejected by hub registry 105. In some embodiments, the receiver sends a network address of a reader device, such as an IP address, to the hub for registration (step 715). In some embodiments, the receiver may provide a hardware-specific identifier, such as a MAC address, of the reader device instead of or in addition to the network address of the reader device. The MAC address of the reader is specific to the hardware of the reader device unlike the network address, which may change over time.

The hub receives and validates the network address of the reader device (step 720). The hub may use domain and subnet information of the network address to determine whether the network address of the reader device belongs to the sender. According to some embodiments, the domain and subnet information of the network address for the reader device may be verified to ensure that the network address corresponds to the company and/or the facility to which the reader device of the sender. According to some embodiments, hub registry 105 may also ping the reader device to device to determine whether the reader device is reachable across the public network (e.g., the Internet) from the hub. According to an embodiment, the MAC address of the reader device may be verified by comparing the MAC address of the reader device to a list of valid MAC addresses that has been provided in advance by the sender. If the MAC address of the reader device being registered matches a MAC address on this list, the device may be registered. If the MAC address of the reader device does not match a MAC address on the list, the reader device may not be registered.

After validating the network address (or MAC address) of the reader device, the hub registers the network address (or MAC address) of the reader device and generates a set of public and private keys specific to the reader device based on the network address (or MAC address) of the reader device. The hub may also use a facility identifier for the facility with which the reader device is associated in generating the public and private keys. The private key is also referred to herein as a Global Device ID (GDID). Hub registry 105 transmits the public and private keys associated with the reader to the receiver, and the receiver receives the public and private keys for the reader device (step 730). As described above, hub registry 105 may encrypt at least the private key generated for the reader device using a company-specific public key associated with the receiver of goods. Only the receiver should have access to the company-specific private key associated with the company-specific private key, thereby precluding other unauthorized entities from intercepting the private keys during transmission and decrypting the encrypted private keys.

Figure 8:
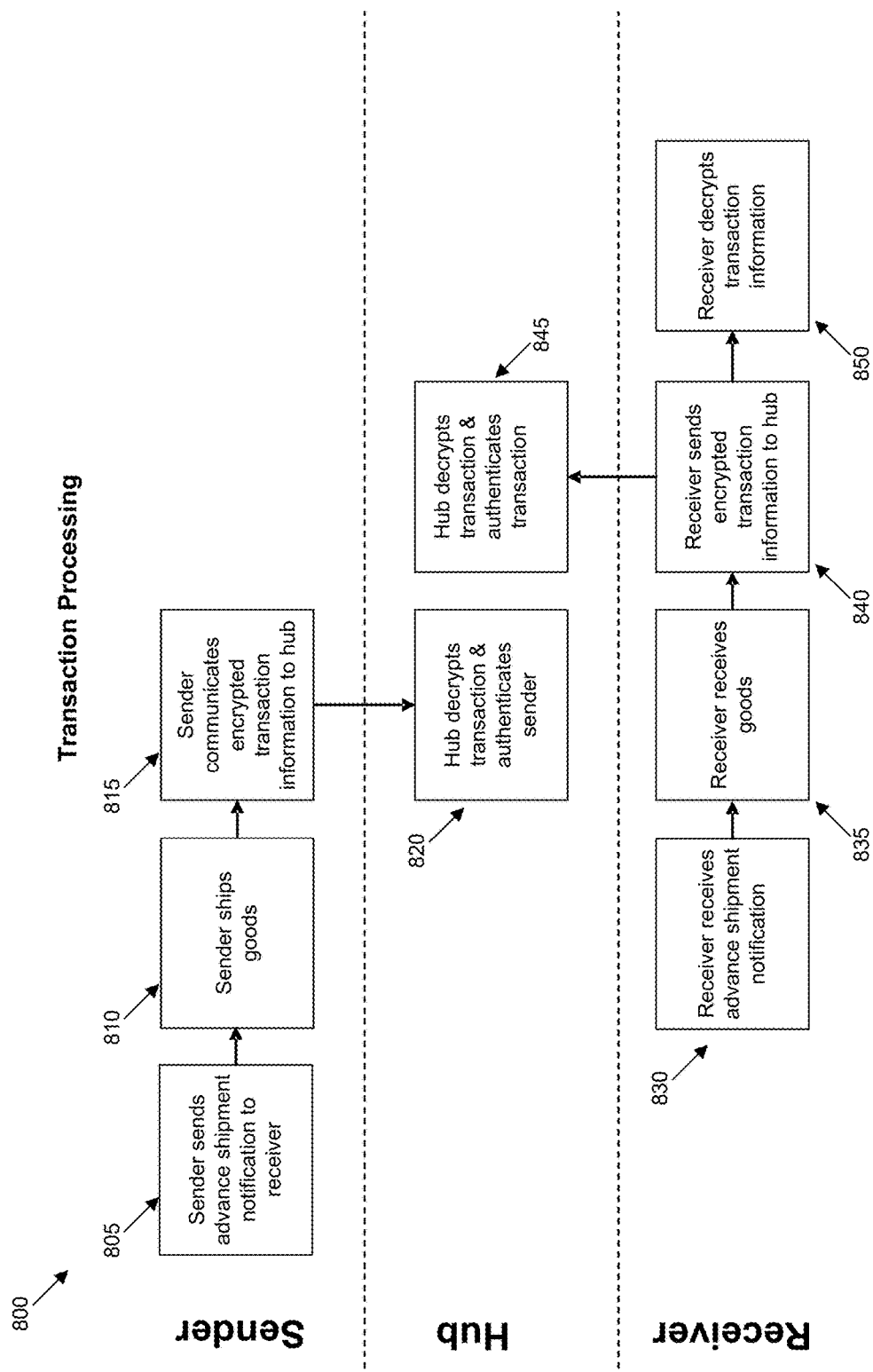
FIG. 8 is a high level flow diagram of a process for authenticating a transaction in a supply chain using an electronic secure supply chain system according to an embodiment.

FIG. 8 is a high level flow diagram of a process 800 for authenticating a transaction in a supply chain using an electronic secure supply chain system according to an embodiment. A shipment of goods may be shipped in multiple steps along a supply chain, and each step along the supply chain may be processed as a separate transaction involving a shipper and a receiver. For each such transaction along the supply chain, the shipper and receiver involved in the transaction are verified and authenticated. For example, a shipment of pharmaceuticals may be shipped from a manufacturer to a distributor, and from the distributor to a retailer that sells the pharmaceuticals to consumers. An audit trail may be created to track each transaction along the supply chain: a first transaction where the manufacturer ships the pharmaceuticals to the distributor, and a second transaction where the distributor ships the pharmaceuticals to the retailer. As illustrated in this example, the same entity may be a receiver of goods in one transaction and a shipper of goods in another transaction along the supply chain. For example, the distributor acts as receiver in a first transaction receiving food from the manufacturer and acts as a shipper in a second transaction sending the goods to the retailer.

A sender of goods may optionally send an advance shipment notification (ASN) to a receiver prior to shipping the goods to the receiver (step 805). The ASN may comprise an electronic file or message that identifies which goods are being shipped to the receiver and who is shipping the goods. The ASN may be transmitted from the sender to the receiver across a network connection using various techniques. For example, the ASN may be transmitted as a file attachment to an email message. The ASN may optionally be encrypted by the sender using the private key associated the reader device to be used for scanning the outgoing shipment of goods at the shipper's facility. The receiver may decrypt the ASN (if encrypted) using the public key associated with the sender's reader device. As previously described, hub registry 105 may make the public keys associated with the registered senders and receivers available to the other registered senders and receivers. For example, hub registry 105 may provide an interface from which a public key associated with a sender or receiver may be requested using an identifier of the sender or receiver. According to some embodiments, hub registry 105 may provide an interface for browsing a list or directory of registered senders and receivers and for downloading copies of public keys for use in decrypting data.

The sender then ships the goods to the receiver (step 810), scanning an identifier tag associated with the goods before the shipment leaves the sender's facility. The outgoing scan may be performed using a reader device at the sender's facility. The transaction information related to the shipment of goods that were shipped is signed and encrypted using a private key associated with a reader device used for the outgoing scan. As described above, when a reader device is registered with hub registry 105, hub registry 105 generates a set of public and private keys for the reader device. The private key provided by hub registry 105 for the reader device used for the outgoing scan is used to sign and encrypt the transaction information. The transaction information may include a tag identifier that uniquely identifies the shipment associated with the tag, also referred to herein as an "Auto-ID." The transaction information may also identify the goods that were shipped and the intended receiver of the goods. FIG. 5, described above, provides an example of information that may be included in the transaction information. According to some embodiments, a copy of the encrypted transaction information may be stored in a memory of the identification tag associated with the shipment of goods before the goods are shipped. For example, the identifier tag associated with the shipment of goods may be an RFID tag that includes a memory for storing data, and the reader device used by the shipper may be configured to write the encrypted transaction data to the memory of the RFID tag.

The sender transmits the signed and encrypted transaction information to hub registry 105 (step 815). Upon receiving the encrypted and signed transaction information, the hub decrypts the transaction information and authenticates the sender (step 820). In one embodiment, the hub decrypts the received encrypted transaction information using the public key associated with the reader device of the sender that was used for the outgoing scan.

Various different techniques may be used in step 820 to identify which reader device at the sender was used for the outgoing scan and to determine the public key for that reader device. In one embodiment, the network address and/or the hardware-specific identifier of the outgoing scan reader device, such as the MAC address of the network interface, may be transmitted in unencrypted form with the encrypted transaction information received from the sender. Hub registry 105 may then use this unencrypted public key to look up and identify the specific reader device and the public key associated with the reader device. In another embodiment, the network address and/or the hardware-specific identifier associated with the reader device may be determined from packets of data used to transmit the encrypted transaction information from the sender's reader device to hub registry 105.

If hub registry 105 is not able to decrypt the transaction information using the public key, the transaction information cannot be authenticated. In one embodiment, an exception is logged and hub registry 105 may notify the intended receiver of the shipment to reject the transaction because the transaction information from the sender could not be authenticated. Otherwise, if hub registry 105 is able to properly decrypt the transaction information, it indicates that the transaction information was properly authenticated. The decrypted transaction information may be stored by the hub registry 105 in an audit log to create an audit trail. The stored transaction information may be used to form an audit trail for tracing the movements of the goods along the supply chain and to prevent the sender from later repudiating the transaction, because the hub has authenticated that the sender has shipped the goods described in the transaction information to the receiver.

According to some embodiments, hub registry 105 may compare the sender and receiver information to a predetermined shipment route as part of the authentication process. If the sender and/or receiver information has deviated from the predetermined route, hub registry 105 may log an exception and notify the sender that was the origin of the goods at the beginning of the supply chain and the receiver of the goods at the end of the supply chain that the shipment of goods took an unexpected route. In some instances, the rerouting of goods may not signal a problem. For example, a shipment may have been diverted along a different route due to shipper constraints (e.g. an equipment problem caused rerouting), weather problems (e.g. a blizzard closed highway) or hurricane shut down shipping in some areas due to flooding), storage problems by a shipper/receiver along a route (e.g. fire caused damage at a warehouse), or other problems.

According to some embodiments, hub registry 105 may provide a user interface, such as a web page, that enables shippers and/or receivers of goods to access and view exceptions that may have occurred as part of authentications performed along the supply chain. The user interface may also enable shippers and/or receivers to enter comments regarding an exception. For example, if hub registry 105 was unable to authenticate the shipper of a shipment of goods and added an exception to the audit history for the shipment, the receiver of the goods might add a comment such as "Holding shipment pending further investigation." This information provides a status for the goods along the supply chain.

As previously described, a sender may transmit an ASN to the receiver. In this case, the receiver receives the ASN indicating that the sender will be shipping the goods to the receiver (step 830). If the ASN has been signed and encrypted by the sender, the receiver may decrypt the ASN using the public key of the reader device used at the sender's facility to scan the goods before being shipped in order to authenticate the source of the ASN. The ASN typically is sent in advance of the goods being shipped and provides notification to the receiver of the goods that the shipment should be arriving at the receiver's facility and that the shipment may already be in transit.

The receiver receives the goods shipped by the sender at the receiver's facility (step 835). Upon receipt of the shipment, a reading device at the receiver is used to scan the RFID tag or other identifier tag associated with the goods received and read the unique identifier associated with the shipment from the tag. According to some embodiments, the reader device at the receiver may also read a copy of encrypted transaction information stored in a memory of the identifier tag. The receiver of the shipment may then authenticate the identity of the shipper of the goods by decrypting the transaction information using the public key associated with the reader device of the shipper that encrypted the information (e.g., the reader device used for the outgoing scan at the sender).

The receiver of the goods then signs and encrypts a set of transaction information using the private key of the reader device that the receiver used to scan the identification tag of the received goods and sends the encrypted transaction information to hub registry 105 (step 845). The encrypted transaction information includes the unique identifier used to identify the goods that was read from the identification tag associated with the shipment of goods, and may also include a copy of the encrypted transaction information provided by the shipper of the goods. The original set of encrypted transaction information sent by the shipper of the goods is now doubly encrypted, a first time using a private key of a reader device of the shipper and second time using a private key of the reader device of the receiver.

Sending the transaction information signed and encrypted by both the sender and receiver provides multilevel authentication to ensure that the goods shipped were actually received by the designated receiver. First, the transaction information read from the RFID tag associated with the goods was signed and encrypted by the sender, which can be used to authenticate the sender. Second, the receiver has signed and encrypted the encrypted information received from the sender, which can be used to authenticate the identity of the receiver and to authenticate that the transaction has been completed.

Hub registry 105 receives the signed and encrypted transaction information (step 845) and decrypts the transaction information. Since the transaction information is encrypted twice, two decryptions are performed (1) the encrypted information received from the receiver is decrypted using the public key of the reader device of the receiver that was used to encrypt the transaction information, and (2) the results of (1) are further decrypted using the public key of the reader device of the sender that was used to encrypt the transaction information at the outgoing scan. Both the shipper and receiver for the transaction are considered authenticated if the hub is able to perform both decryptions and obtain decrypted transaction information. If the shipper, receiver, or both are not who they purport to be, then at least one of the decryptions or possibly both will fail indicating an unsuccessful authentication, and the hub will log an exception and halt the transaction.

According to some embodiments, the receiver may not include the encrypted transaction information received from the shipper in the set of encrypted transaction information provided to hub registry 105. In such a scenario, hub registry 105 merely decrypts the signed and encrypted transaction information provided by the receiver of the goods using the public key of the receiver's reader device.

The receiver also decrypts the transaction information received from the sender using the public key of the reader device (step 850). If the private key used to sign and encrypt the transaction information matches the sender's public key, the receiver will be able to decrypt the transaction information. The receiver may notify the hub if the receiver is not able to authenticate the sender. The receiver may also take other remedial measures, such as quarantining the goods received while an investigation of origin of the goods is conducted. If the receiver is not at the end of the supply chain, the receiver may in turn ship the goods to a next receiver along the supply chain using the steps described in process 800. For example, the receiver of the goods may be a distribution center that will then ship the goods to another receiver along the supply chain.

According to some embodiments, hub registry 105 may also compare the sender and receiver information to an expected or predetermined route for the shipment. If the shipment deviates from the predetermined route, hub registry 105 may add an exception to the audit log associated with the shipment and/or reject the transaction.

Figure 9:
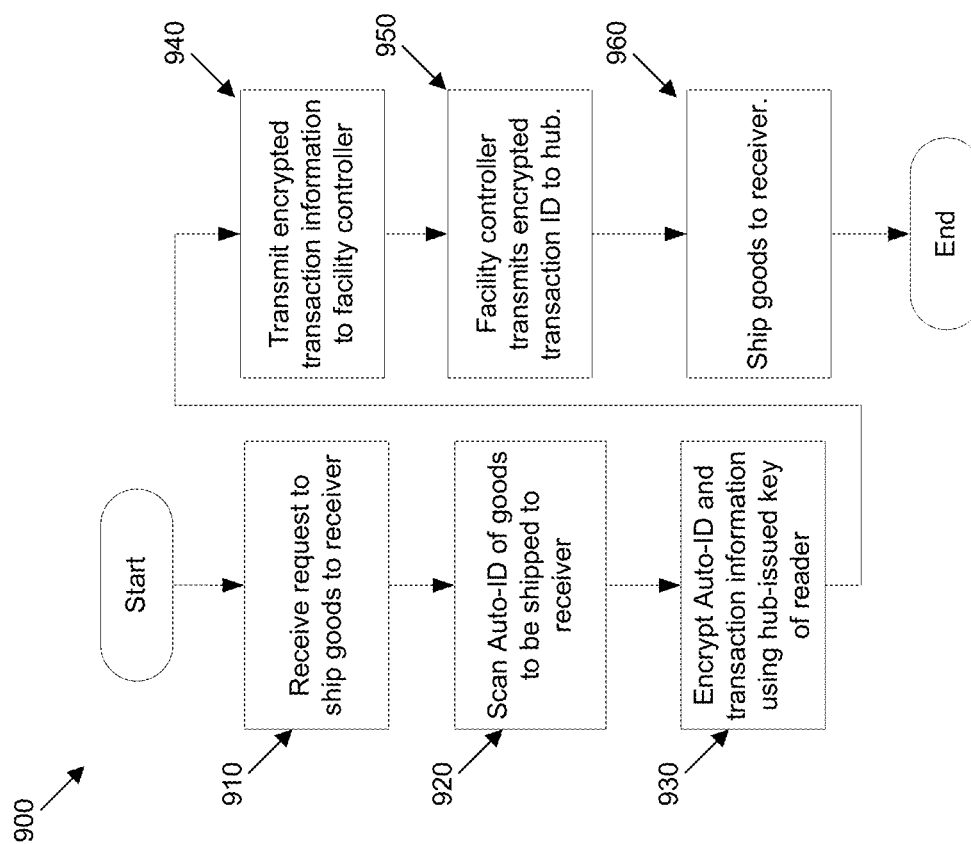
FIG. 9 is a high level flow diagram of a process for handling requests to ship goods from a sender to a receiver according to an embodiment.

FIG. 9 is a high level flow diagram of a process 900 for handling requests to ship goods from a sender to a receiver according to an embodiment. A request is received to ship goods to a receiver (step 910). The sender packages the goods and attaches an identifier tag to the shipment if the goods do not already have an identifier tag. In some embodiments, the goods may already have an identifier tag associated with them. For example, the goods may have been shipped from another sender earlier in the supply chain. The identification tag may be included in or affixed to the goods being shipped or including in or affixed to a shipping container in which the goods are to be shipped. In an embodiment, the identifier tag is an RFID. The sender scans the unique identifier of the tag using a reader device 130 (step 920), such as the Auto-ID of the tag, from the identification tag affixed to the shipment.

Transaction information, including the Auto-ID of the identifier tag and other information, such as the information about the goods being shipped, the identity of the sender, and the receiver, and/or information about other senders/receivers along the supply chain (if available), is signed and encrypted using the private key associated with the reader device used to scan the identifier tag (step 930). According to some embodiments, a copy of the encrypted transaction information may also be stored in a memory of the identifier tag by the reader device.

The encrypted transaction information may be transmitted from the reader device to the facility controller 135 of the facility associated with the reader (step 940). The facility controller then transmits the encrypted transaction information to the hub (step 950). In an embodiment, the reader device may transmit the encrypted transaction information to the facility controller across a wired or a wireless network connection. In an embodiment, the reader device 130 may transmit the encrypted transaction information to the hub via a wireless or wired network connection.

After the signing and encrypting the transaction information and transmitting the signed and encrypted transaction information to hub registry 105 for authentication, the shipper ships the goods to the receiver (step 960).

Figure 10:
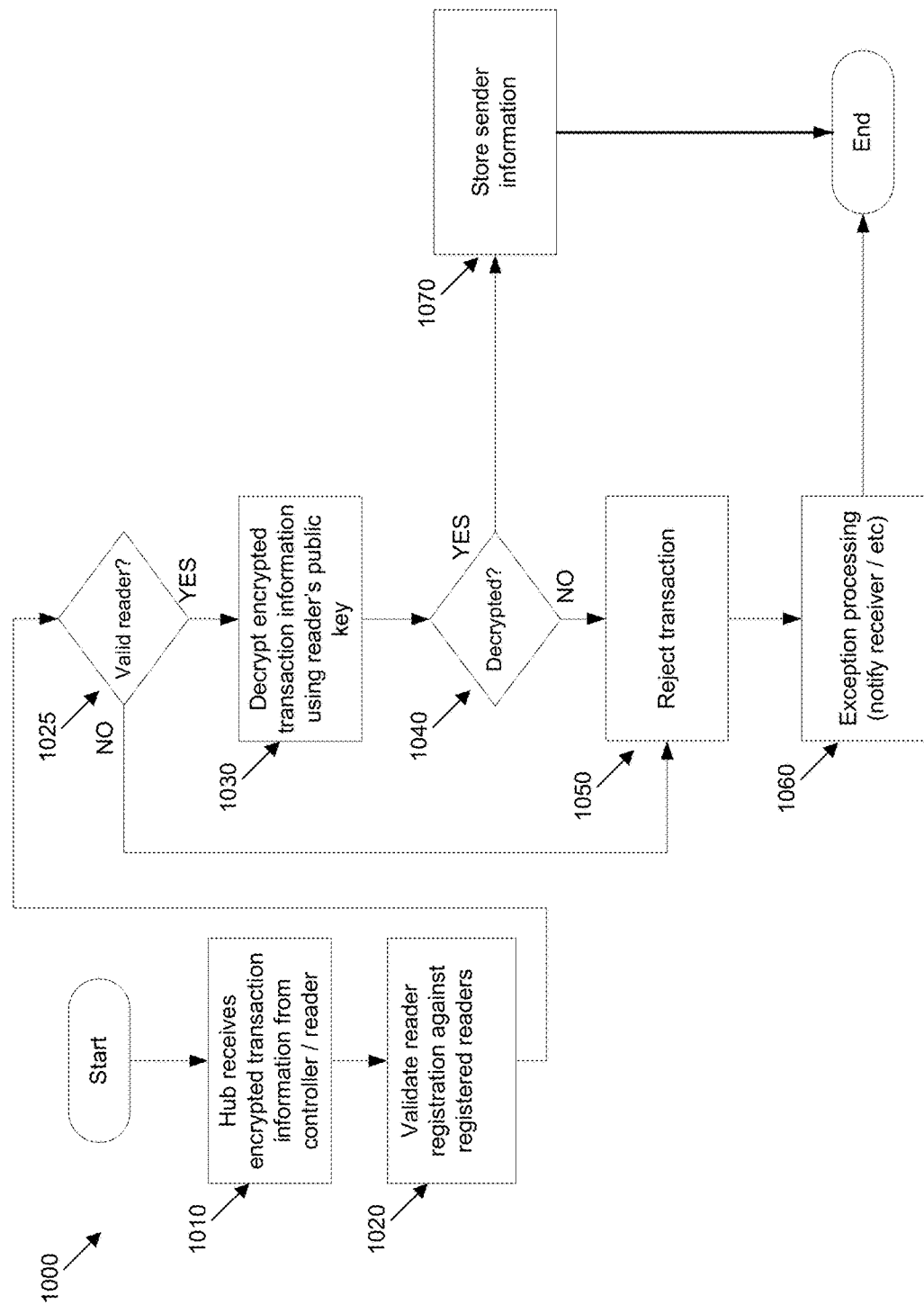
FIG. 10 is a high level flow diagram of a process for authenticating a shipper and tracking a transaction according to an embodiment.

FIG. 10 is a high level flow diagram of a process 1000 for authenticating a sender of goods and tracking a transaction according to an embodiment. Hub registry 105 may verify the identity of a sender of goods. Hub registry 105 receives encrypted transaction information from a controller or reader at a facility of the shipper of the goods (step 1010). As described above, the sender of the goods scans an identifier tag associated with the goods with a reader device and sends signed and encrypted transaction information to hub registry 105 for authentication. The transaction information is signed and encrypted using a private key associated with the reader device.

The hub registry 105 validates the reader device from which the transaction information was received against a set of valid reader device that have been registered with hub registry 105 (step 1020). Hub registry 105 may maintain a data store of valid reader devices that have been registered with hub registry, e.g. using a process similar to process 600 described above. The transaction information may include the MAC address, the IP address and/or other unique identifier associated with the reader device. A determination is made whether the unique identifier of the reader provided with the transaction information matches the unique identifier associated with a registered reader device (step 1025). If the unique identifier associated with the reader device does not match that of a valid, registered reader device, then hub registry 105 rejects the transaction (step 1050).

Otherwise, if the reader device is registered with hub registry 105, hub registry 105 looks up the public key associated with reader device, and hub registry 105 attempts to decrypt the encrypted transaction data using the public key associated with the reader device that was used to scan the goods (step 1030). As described above, each reader device may be assigned a public and private key pair by hub registry 105. Before shipping a shipment of goods, the sender scans a tag associated with the shipment of goods. The reader device used to scan the tag associated with the shipment of goods uses the private key associated with the reader device to encrypt a set of transaction information. The transaction information, including the Auto-ID of the tag and other information, such as the information about the goods being shipped, the identity of the sender, and the receiver, and/or information about other senders/receivers along the supply chain (if available), is signed and encrypted using the private associated with the reader device. The private key is kept secret, with only the reader device and hub registry 105, which registered the reader device and issued the public and private key pair to the reader device, having access to the private key. If hub registry is able to decrypt the encrypted transaction information using the public key associated with the reader device, then hub registry has authenticated reader device.

A determination is made where hub registry 105 was able to decrypt the encrypted transaction data using the public key associated with the reader device (step 1040). If hub registry 105 was unable to decrypt the encrypted transaction data using the public key associated with the reader device from which the encrypted transaction information was purported to have originated, hub registry 105 rejects the transaction. If the data could not be encrypted by hub registry 105, the reader device may not have been in possession of the correct private key, or an authorized entity posing as a valid, registered shipper may have attempted to spoof the system.

Hub 105 may execute various exception handling procedures if the reader device that scanned the shipment of goods was not valid or if the private key used to encrypt the transaction information was not valid. If the reader device was not registered with hub registry 105, hub registry 105 may provide the shipper with an opportunity to register the reader device. For example, in some embodiments, a reader device may be identified using an IP address associated with the device. The IP address associated with a reader device may be dynamically allocated, e.g. using the Dynamic Host Configuration Protocol (DHCP) or a similar technique for automatically allocating IP addresses to devices on a network, which may result in a reader device for a shipper being allocated a new IP address that does not match the an IP address of a registered reader device. For example, if a reader device is rebooted, a new IP address may be allocated to the reader device. Upon receiving transaction information from an unregistered device, the hub registry 105 may send a message to the shipper indicating that the reader device was not registered and providing the shipper with the opportunity to register the device, e.g. using a process similar to process 1300 illustrated in FIG. 13, described below.

Hub registry 105 may also notify the intended receiver of the shipment that the shipper could not be authenticated, and that the transaction should be rejected and the goods not accepted. For example, hub registry 105 may be configured to generate a text message, such as an email, a Short Message Service (SMS) message, or a message in a markup language, such as Hypertext Markup Language (HTML) or Extensible Markup Language (XML).

If hub registry 105 was able to decrypt the encrypted transaction data using the public key associated with the reader device from which the encrypted transaction information was purported to have originated, hub registry 105 stores the transaction information (step 1070) in order to create an audit history for the shipment of the goods. The entity that shipped the goods scanned the shipment using a registered reader device and was in possession of a valid private key.

Figure 11:
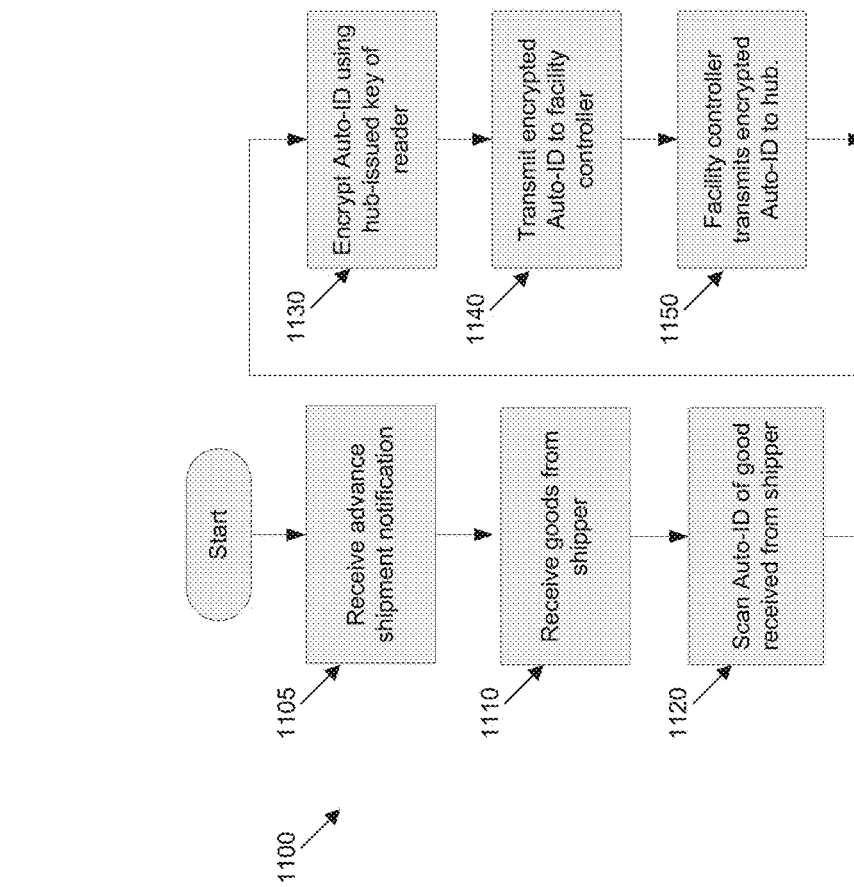
FIG. 11 is a high level flow diagram of a process for authenticating a shipment of goods received by a receiver according to an embodiment.

FIG. 11 is a high level flow diagram of a process 1100 for authenticating a shipment of goods received by a receiver according to an embodiment. The receiver may receive an advance shipment notification (ASN) from the shipper of the goods (step 1105). An ASN provides an electronic notification of a pending delivery of goods from a shipper. The ASN may include a listing of the contents of the shipment, as well as additional information such as product descriptions of the goods, physical characteristics of the shipment, such as a number of units of goods shipped, the type of packaging used to store the goods, a carrier used to transport the goods from the shipper to the receiver, and/or other information related to the shipment of goods. The ASN may also include a list of unique identifiers of identifier tags associated with each shipping unit being shipped as well as the contents of each shipping unit. The unique identifiers may be associated with a barcode or a RFID tag associated with each shipping unit.

The receiver receives the shipment of goods from the shipper (step 1110), and scans the identifier tag associated with the shipment using a reader device. The reader device reads a unique identifier for the shipment from the identifier tag (step 1120), e.g. an Auto-ID associated with the shipment the identifier tag is an RFID tag. After determining the Auto-ID associated with the shipment of goods, the receiver signs and encrypts transaction information related to the received goods, including the Auto-ID read from the tag (step 1130). The transaction information is encrypted using the private key associated with the reader device of the receiver of the goods that was used to read the tag associated with the goods (step 1130). The receiver of the goods then transmits the encrypted transaction information to hub registry 105 to a facility controller 135 of the facility associated with the reader (step 1140), and facility controller 135 transmits the encrypted transaction information to hub registry 105 (step 1150). In an embodiment, the reader device may transmit the encrypted transaction information to hub registry 105 across a network, such as the Internet, without transmitting the information through facility controller 135 and/or company controller 125. According to some embodiments, step 1140 and 1150 may be omitted and the reader device may transmit the encrypted transaction information to hub registry 105 via a network connection without passing through company controller 125 or facility controller 135.

Figure 12:
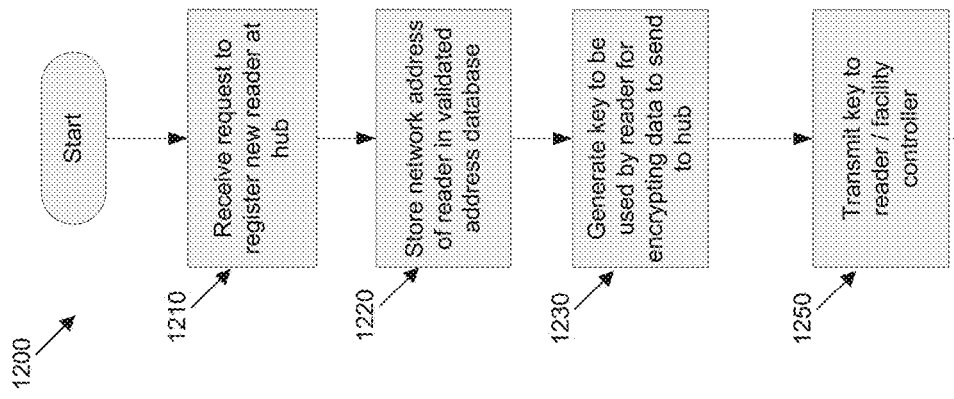
FIG. 12 is a high level flow diagram of a process for generating a new set of encryption keys for a reader device according to an embodiment.

FIG. 12 is a high level flow diagram of a process 1200 for generating a new set of encryption keys for a reader device according to an embodiment. As described above, a shipper and/or receiver of goods may register one or more reader devices with hub registry 105 to facilitate the tracking of the goods along a supply chain and to authenticate the identities of the entities that ship and receive the goods.

Hub registry 105 receives a request from a sender and/or receiver of goods to register a reader device with hub registry 105. According to some embodiments, the request may be received electronically via network interface 110. The reader device may be a new reader device or may be a device that has been assigned a new network address. For example, a new set of devices may be added if a sender or receiver of goods expands a facility or adds a new facility for handling shipments tracked and authenticated by the electronic secure supply chain system. A reader device may be assigned a new network address if the reader device is rebooted or reset.

Hub registry 105 may prevent unauthorized entities from submitting a request to register a reader device by validating a network address of the source of the request to register the device. For example, hub registry 105 may compare the network address from which the request originated to the network addresses of the company controller 125 or a facility controller 135 associated with the shipper and/or receiver of goods from which the request was received. If the network address from which the request originated does not match a network address registered with hub registry 105, hub registry 105 may reject the request to register the new reader device.

Hub registry 105 stores a unique identifier for the reader device in a registered reader device data store. The unique identifier may include a network address assigned to the reader device, such as an IP address, a hardware-based identifier, such as a MAC address, or a combination thereof.

Hub registry 105 generates a set of keys to be associated with the reader device based on the network address and/or the hardware-based identifiers of the reader device: a public key and a private key (step 1230). Each reader device will have a unique public and private key pair that is associated solely with that reader device. The public key may be used to decrypt data encrypted using the private key and vice versa. Hub registry 105 stores a copy of the public and private keys associated with the reader device in a secure data store. Hub registry 105 also provides a copy of the public and private key to the shipper and/or receiver of goods that requested the registration of the reader device (step 1240).

The private key should be kept secret and only be known to the sender or receiver of the goods and hub registry 105. The private key enables the sender or receiver of goods to sign and encrypt data, which can only be decrypted using the public key from the pair of keys associated with sender or receiver of goods. According to some embodiments, the private key may be transmitted electronically via network connection 110 to the sender or receiver of the goods using an encrypted transaction. For example, the private key may be encrypted transmitted to the sender or receiver, and a password used to decrypt the encrypted private key may be provided via a separate transaction. For example, the private key may be provided via a separate transaction, e.g. via an email message, via an audio/voice message, or via a hard-copy of a printed letter mailed to the sender or receiver via a mail service. According to some embodiments, the private key may be provided to the sender or receiver on a tangible computer-readable medium, such as a USB flash drive or a CD or DVD-ROM that is physically mailed to the sender or receiver of goods for installation on the reader device. The copy of private key provided on the tangible computer-readable medium may be encrypted to prevent the key from being read, and a password to decrypt the encrypted private key may be provided separately. For example, the password may be mailed in a letter separate from the computer-readable medium or may be sent via a different method, such as email.

The public key associated with the sender or receiver of goods may be disseminated to all entities registered with the electronic secure supply chain system. The public key may be used to decrypt encrypted transaction information received from the sender or receiver of goods in order to authenticate the source of the transaction information. If the public key associated with the reader device from which the transaction information is received cannot be used to decrypted the signed and encrypted information, the source of the encrypted transaction information may not be who they purport themselves to be, and the party receiving the transaction information may reject the transaction and report the information received to hub registry 105.

Figure 13:
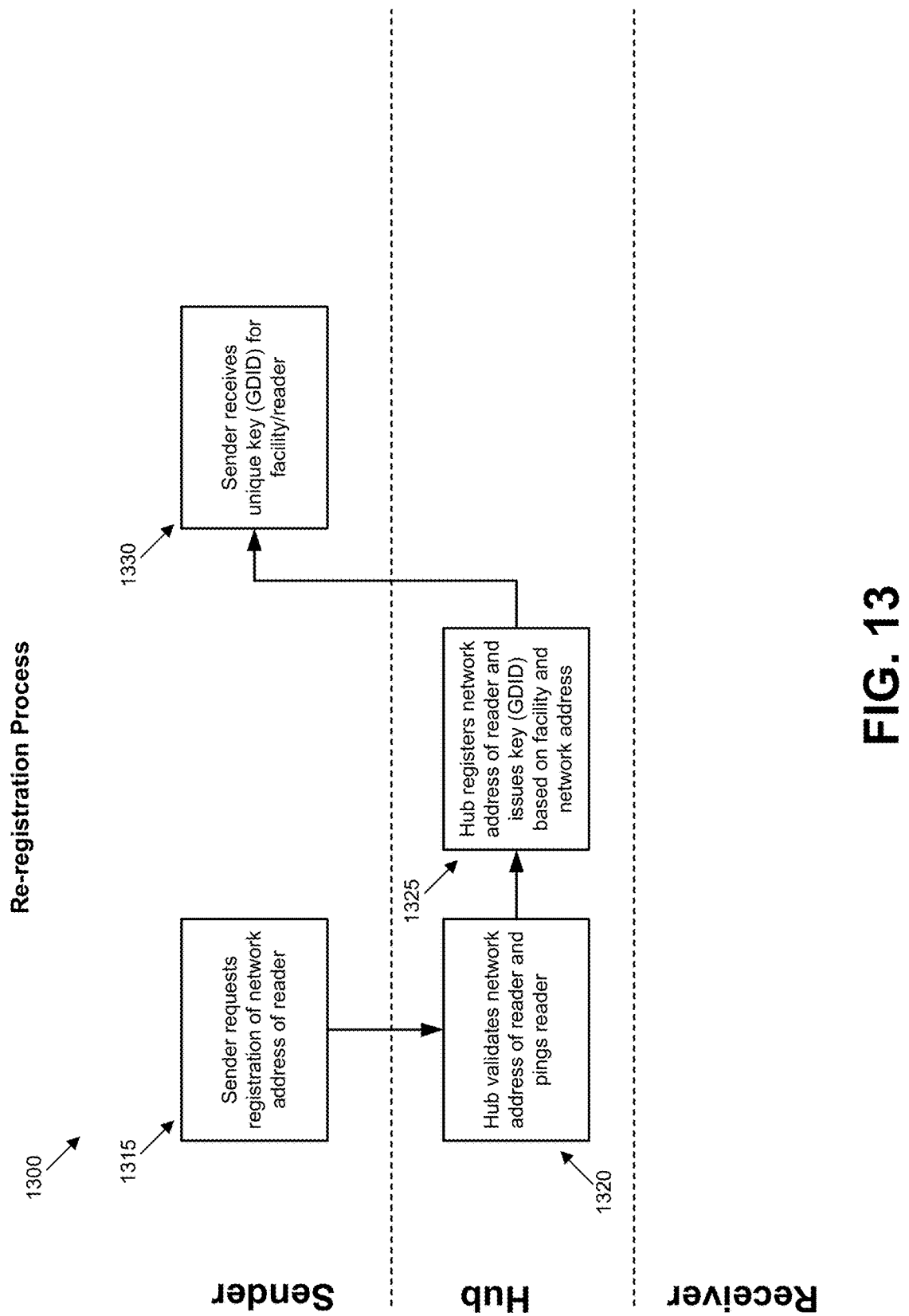
FIG. 13 is a high flow diagram of a process for re-registering a reader device for a sender of goods in a supply chain with the hub of an electronic secure supply chain system according to an embodiment.

FIG. 13 is a high flow diagram of a process for re-registering a reader device for a sender (shipper) of goods in a supply chain with the hub of an electronic secure supply chain system according to an embodiment. A reader device may need to be reregistered if the reader has been assigned a new network address by the sender. For example, if a reader device has been reset or rebooted, the reader device may be assigned a new network address by the sender and would need to be reregistered with hub registry 105 if the public/private key pair associated with reader device was generated using a previous network address of the reader device.

The sender (shipper) of goods sends a device registration request to hub registry 105 (step 1315). Hub registry 105 validates the network address of the reader device (step 1320) in response to receiving the registration request from the sender. Hub registry 105 may, for example, execute a "ping" to determine whether the IP address of the reader device is reachable from hub registry 105. If hub registry 105 is able to validate the network address of the reader, the hub registry 105 generates a pair of public and private keys for the reader device based on the network address of the device or a hardware-specific identifier, such as a MAC address of a network interface included in the reader device (step 1325). Hub registry 105 provides at least the private key of the reader device to the sender who sent the registration request to the hub. If hub registry 105 was unable to verify the network address of the reader device, hub registry 105 may send a message to the sender that indicates that the reader device could not be registered.

Figure 14:
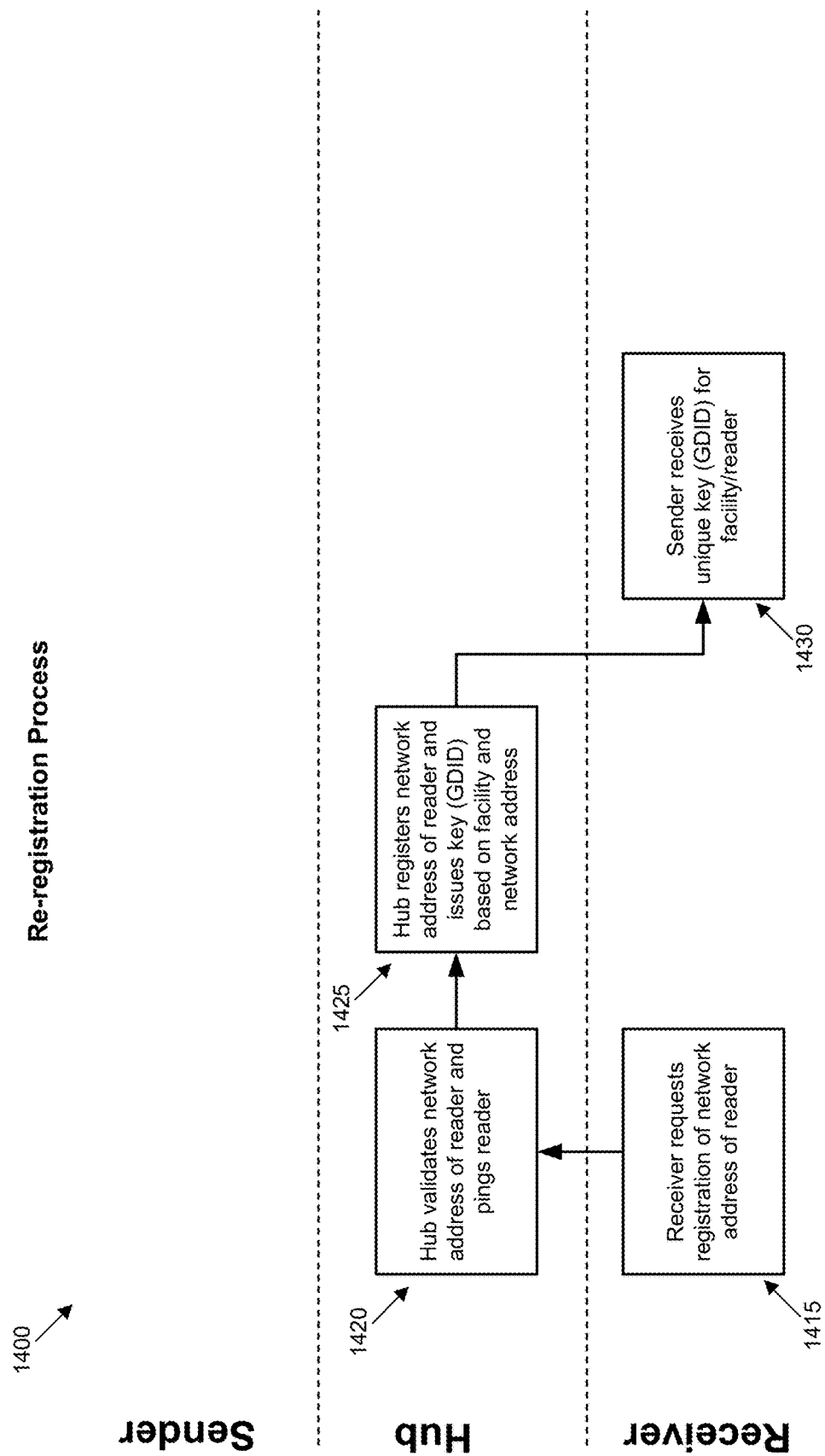
FIG. 14 is a high level flow diagram of a process for re-registering a reader device for a receiver of goods in a supply chain with the hub of an electronic secure supply chain system according to an embodiment.

FIG. 14 is a high level flow diagram of a process 1400 for re-registering a reader device for a receiver of goods in a supply chain with the hub of an electronic secure supply chain system according to an embodiment. The process for re-registering a reader device for a receiver of goods may be similar to the process 1400 for re-registering a reader device for a shipper of goods described above. A receiver of goods may need to re-register a reader if the reader device has been reset or rebooted and the network address associated with the reader is dynamically allocated. A new pair of public and private keys should be generated by hub registry 105 for the reader device based at least on the new network address, and in some embodiments, a hardware-based identifier, such as a MAC address of the reader device.

The receiver of goods sends a device registration request to hub registry 105 (step 1415). Hub registry 105 validates the network address of the reader device (step 1420) in response to receiving the registration request from the sender. Hub registry 105 may, for example, execute a "ping" to determine whether the IP address of the reader device is reachable from hub registry 105. If hub registry 105 is able to validate the network address of the reader, the hub registry 105 generates a pair of public and private keys for the reader device based on the network address of the device and/or a hardware-specific identifier, such as a MAC address of a network interface included in the reader device (step 1425). Hub registry 105 provides at least the private key of the reader device to the sender who sent the registration request to the hub. If hub registry 105 was unable to verify the network address of the reader device, hub registry 105 may send a message to the sender that indicates that the reader device could not be registered.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A computer-readable storage device storing a plurality of instructions which, when executed by one or more processors, cause the one or more processors perform operations comprising:
   transmitting, by a hub registry system, a first private key to a first device, the first device being one of a plurality of devices along a supply chain, the first private key being encrypted;
   transmitting, by the hub registry system, a second private key to a second device, the second device being one of the plurality of devices along the supply chain, and the second private key being encrypted;
   receiving, by the hub registry system, first encrypted transaction data, the first encrypted transaction data being encrypted with the first private key;
   decrypting, by the hub registry system, the first encrypted transaction data using a first public key associated with the first device to authenticate a sender of goods;
   storing, by the hub registry system, in an audit history for a chain of custody of the goods, at least part of the decrypted first encrypted transaction data;
   receiving, by the hub registry system, second encrypted transaction data, the second encrypted transaction data comprising the first encrypted transaction data being further encrypted with the second private key;
   decrypting, by the hub registry system, the second encrypted transaction data using a second public encryption key associated with the second device and the first public key associated with the first device to authenticate a receiver of the goods; and
   storing, by the hub registry system, in the audit history for the chain of custody of the goods, at least part of the decrypted second encrypted transaction data.

2. The computer-readable storage device of claim 1, wherein the first device is a reader device registered by the sender of the goods.

3. The computer-readable storage device of claim 1, wherein the sender of the goods comprises a first point of a plurality of points along the supply chain.

4. The computer-readable storage device of claim 1, wherein the first encrypted transaction data identifies the goods being shipped and the sender of the goods.

5. The computer-readable storage device of claim 1, wherein the first private key is associated with the sender of the goods by the hub registry system.

6. The computer-readable storage device of claim 1, wherein the audit history for the chain of custody of the goods comprises information tracking transportation of the goods between points along the supply chain.

7. The computer-readable storage device of claim 1, wherein the operations further comprise:
   providing, by the hub registry system, the audit history for the chain of custody of the goods to the sender of the goods and the receiver of the goods.

8. The computer-readable storage device of claim 1, wherein the operations further comprise:
   receiving, by the hub registry system, the second encrypted transaction data from the second device, the second device being a reader device registered to the receiver of the goods.

9. The computer-readable storage device of claim 1, wherein the receiver of the goods comprises a point of a plurality of points along the supply chain.

10. The computer-readable storage device of claim 1, wherein the second private key is associated with the receiver of the goods by the hub registry system.

11. The computer-readable storage device of claim 1, wherein the second encrypted transaction data comprises additional information identifying the goods being received.

12. The computer-readable storage device of claim 1, wherein the second encrypted transaction data identifies the receiver of the goods.

13. The computer-readable storage device of claim 1, wherein the operations further comprise:
   rejecting, by the hub registry system, a transaction associated with the first encrypted transaction data if authentication of one or more of the sender of the goods or the receiver of the goods failed.

14. The computer-readable storage device of claim 13, wherein the operations further comprise:
   storing, in the audit history for the chain of custody of the goods, a unique identifier associated with a shipment of goods, a first identifier associated with the sender of the goods, and a second identifier associated with the receiver of the goods;
   wherein rejecting the transaction associated with the first encrypted transaction data if authentication of one or more of the sender or the receiver of the goods failed further comprises:
   generating a shipment exception message indicating authentication of one or more of the sender of the goods or the receiver of the goods failed;
   sending the shipment exception message to the sender of the goods and the receiver of the goods; and
   storing information from the shipment exception message in the audit history for the chain of custody of the goods.

15. The computer-readable storage device of claim 1, wherein the first encrypted transaction data and the second encrypted transaction data include a unique identifier associated with shipment of the goods;
   wherein the unique identifier associated with the shipment of goods is associated with a radio-frequency identification (RFID) tag associated with the shipment of the goods; and
   wherein the first device and second device each comprise RFID reader devices.

16. The computer-readable storage device of claim 15, wherein the operations further comprise registering one or more reader devices comprising:

receiving a particular request to register a particular reader device of the one or more reader devices from a sender of the goods or receiver of the goods;

wherein the particular reader device is configured to read the unique identifier from an identifier tag associated with the shipment of the goods;

validating a network address associated with the particular request to determine whether the network address includes a set of network addresses of registered senders of the goods and receivers of the goods;

adding at least one of a network address and a hardware-specific identifier of the particular reader device to a set of registered devices associated with the sender of the goods or receiver of the goods;

generating a private key and a public encryption key for the particular reader device based on the at least one of a network address and a hardware-specific identifier of the particular reader device;

wherein the first private key is located at a facility associated with the sender of the goods; and wherein the particular reader device located at the facility associated with the sender of the goods scans the identifier tag to determine the unique identifier associated with the shipment of the goods.

17. The computer-readable storage device of claim 16, wherein decrypting the first encrypted transaction data further comprises:

identifying the first public key associated with the first device based on at least one of the network address and the hardware-specific identifier of the first device located at the facility associated with the sender of the goods, the first public key being located at the facility associated with the sender of the goods;

wherein the second device is reader device located at a facility associated with the receiver of the goods; and wherein the second device scans the unique identifier tag to determine the unique identifier.

18. The computer-readable storage device of claim 17, wherein decrypting the second encrypted transaction data further comprises:

identifying the second public key based on at least one of the network address and the hardware-specific identifier of the second device, the second public key being located at the facility associated with the receiver of the goods.

19. A computer-implemented method comprising:

transmitting, by a hub registry system, a first private key to a first device, the first device being one of a plurality of devices along a supply chain, the first private key being encrypted;

transmitting, by the hub registry system, a second private key to a second device, the second device being one of the plurality of devices along the supply chain, and the second private key being encrypted;

receiving, by the hub registry system, first encrypted transaction data, the first encrypted transaction data being encrypted with the first private key;

decrypting, by the hub registry system, the first encrypted transaction data using a first public key associated with the first device to authenticate a sender of goods;

storing, by the hub registry system, in an audit history for a chain of custody of the goods, at least part of the decrypted first encrypted transaction data;

receiving, by the hub registry system, second encrypted transaction data, the second encrypted transaction data comprising the first encrypted transaction data being further encrypted with the second private key;

decrypting, by the hub registry system, the second encrypted transaction data using a second public encryption key associated with the second device and the first public key associated with the first device to authenticate a receiver of the goods; and storing, by the hub registry system, in the audit history for the chain of custody of the goods, at least part of the decrypted second encrypted transaction data.

20. A system comprising:

one or more processors; and a memory coupled with the one or more processors, the memory configured to store instructions that when executed by the one or more processors cause the one or more processors to:

transmit a first private key to a first device, the first device being one of a plurality of devices along a supply chain, the first private key being encrypted;

transmit a second private key to a second device, the second device being one of the plurality of devices along the supply chain, and the second private key being encrypted;

receive first encrypted transaction data, the first encrypted transaction data being encrypted with the first private key associated with a first device;

decrypt the first encrypted transaction data using a first public key associated with the first to authenticate a sender of goods; store in an audit history for a chain of custody of the goods, at least part of the decrypted first encrypted transaction data;

receive second encrypted transaction data, the second encrypted transaction data comprising the first encrypted transaction data being further encrypted with the second private key associated with a second device;

decrypt the second encrypted transaction data using a second public encryption key associated with the second device and the first public key associated with the first device to authenticate a receiver of the goods; and store in the audit history for the chain of custody of the goods, at least part of the decrypted second encrypted transaction data.

* * * * *